(12) United States Patent
Imamura et al.

(10) Patent No.: US 6,991,057 B2
(45) Date of Patent: Jan. 31, 2006

(54) SNOWMOBILE SUSPENSION SYSTEM

(75) Inventors: Takashi Imamura, Iwata (JP); Makoto Ichikawa, Iwata (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 0 days.

(21) Appl. No.: 10/698,980

(22) Filed: Oct. 31, 2003

(65) Prior Publication Data

US 2004/0159483 A1 Aug. 19, 2004

(30) Foreign Application Priority Data

Oct. 31, 2002 (JP) .................................. 2002-316917

(51) Int. Cl.
B62M 27/02 (2006.01)

(52) U.S. Cl. ....................................... 180/193; 180/190
(58) Field of Classification Search ................ 180/193, 180/190, 194, 9.1, 9.5, 9.52, 9.54, 9.58
See application file for complete search history.

(56) References Cited

U.S. PATENT DOCUMENTS

| | | | |
|---|---|---|---|
| 3,613,811 A | 10/1971 | Brandli | |
| 3,721,308 A | 3/1973 | Brandli et al. | |
| 3,773,126 A | 11/1973 | Irvine | |
| 3,784,263 A | 1/1974 | Hendrickson et al. | |
| 3,788,412 A | 1/1974 | Vincent | |
| 3,863,727 A | 2/1975 | Michrina | |
| 4,133,400 A | 1/1979 | Shiraishi | |
| 4,284,161 A | 8/1981 | Blass | 180/184 |
| 4,305,476 A | 12/1981 | Blass et al. | |
| 4,314,618 A | 2/1982 | Tamura | |
| 4,407,386 A | 10/1983 | Yasui et al. | |
| 4,459,173 A | 7/1984 | Peters | |

(Continued)

FOREIGN PATENT DOCUMENTS

| | | |
|---|---|---|
| CA | 2298749 | 8/2001 |
| EP | 1312538 A1 | 5/2003 |
| EP | 1336557 A2 | 8/2003 |
| JP | 54-051134 | 4/1979 |
| JP | 55-019648 | 2/1980 |
| JP | 55-022537 | 2/1980 |
| JP | 55-099475 | 7/1980 |
| JP | 55-156770 | 12/1980 |
| JP | 56-034577 | 4/1981 |
| JP | 56-079065 | 6/1981 |
| JP | 58-026684 | 2/1983 |
| JP | 62-214065 | 9/1987 |
| JP | 03-157283 | 7/1991 |
| JP | 03-276888 | 12/1991 |
| JP | 08-207838 | 8/1996 |
| JP | 09-142344 | 6/1997 |
| JP | 10-100981 | 4/1998 |
| WO | WO99/474111 | 9/1999 |

OTHER PUBLICATIONS

U.S. Appl. No. 10/744,611 filed Dec. 22, 2003 by Masanori Yoshihara.
U.S. Appl. No. 10/745,397 filed Dec. 22, 2003 by Masanori Yoshihara.
U.S. Appl. No. 10/745,301 filed Dec. 22, 2003 by Takahiko et al.

(Continued)

Primary Examiner—Daniel G. DePumpo
(74) Attorney, Agent, or Firm—Knobbe, Martens, Olson & Bear LLP

(57) ABSTRACT

A snowmobile includes a quadrilateral linkage system formed between a vehicle body frame, a front torque arm assembly, a rear torque arm assembly, and an extendable member. The four-node linkage is coupled with at least one slide rail to provide for the vertical distance between the vehicle body frame and the at least one slide rail to vary. The nodes of the four-node linkage are configured to generally define a quadrilateral shape in at least fully contracted and fully expanded configurations.

40 Claims, 11 Drawing Sheets

U.S. PATENT DOCUMENTS

| | | | |
|---|---|---|---|
| 4,462,480 A | | 7/1984 | Yasui et al. |
| 4,518,056 A | | 5/1985 | Kobayashi |
| 4,892,164 A | | 1/1990 | Yasui et al. |
| 4,892,165 A | | 1/1990 | Yasui et al. |
| 4,917,207 A | | 4/1990 | Yasui et al. |
| 5,060,745 A | | 10/1991 | Yasui et al. |
| 5,265,692 A | | 11/1993 | Mallette |
| 5,586,614 A | | 12/1996 | Kouchi et al. |
| 5,660,245 A | | 8/1997 | Marier et al. |
| 5,667,031 A | | 9/1997 | Karpik |
| 5,692,579 A | | 12/1997 | Peppel et al. |
| 5,727,643 A | | 3/1998 | Kawano et al. |
| 5,730,242 A | | 3/1998 | Furusawa |
| 5,904,216 A | | 5/1999 | Furusawa |
| 5,947,220 A | | 9/1999 | Oka et al. |
| 5,994,134 A | | 11/1999 | Giroux |
| 6,109,382 A | | 8/2000 | Kubota |
| 6,161,908 A | | 12/2000 | Takayama et al. |
| 6,206,124 B1 | * | 3/2001 | Mallette et al. ............. 180/193 |
| 6,234,264 B1 | | 5/2001 | Boivin et al. |
| 6,237,706 B1 | * | 5/2001 | Karpik et al. .............. 180/9.52 |
| 6,283,241 B1 | | 9/2001 | Kubota |
| 6,354,391 B1 | | 3/2002 | Cormican |
| 6,390,219 B1 | * | 5/2002 | Vaisanen .................... 180/193 |
| 6,450,279 B1 | | 9/2002 | Imamura |
| 6,450,280 B1 | | 9/2002 | Pepka et al. ................ 180/193 |
| 2003/0034191 A1 | * | 2/2003 | Karpik ....................... 180/193 |

OTHER PUBLICATIONS

European Search Report , May 7, 2004.

Yamaha Parts Catalogue Model Year 1997, Track Suspension 2, pp. A1 and C11.

Yamaha Parts Catalogue Model Year 2001, *Mountain–Max*, MM600F, MM700F, Track Suspension 2, pp. A1 and D9.

Yamaha Parts Catalogue Model Year 2001, *Bravo*, BR250TF, Track Suspension 2, pp. A1 and C10.

Polaris Parts Manual 2002, 700 Classic Edge, Model #S02ND7CS, Rev. 01, pp. B6–B11.

Polaris Parts Manual 2002, WideTrak LX Model #S02SU4BS, Euro Widetrak LX Model #S02SU4BE Rev.01, pp. B3–B7.

Polaris Parts Manual 2002, 120 XC SP, Model #S02WB1AS Rev. 01, p. A11.

Polaris Parts Manual 2002, 600 Classic Touring Model #S02ST6ES, Model #S02ST6ESA, Rev. 01, pp. B9–B12.

Polaris Parts Manual 2002, 800 RMK F/O 151, Model #S02NL8CS, Built After Mar. 1, 2001; 800 RMK 151 Stock, Model #S02NL8CSA, Rev. 01, B8–B11.

Polaris Parts Manual 2002, Indy 340 Touring, Model #S02LT3AS, Rev. 01, pp. B3–B6.

Polaris Parts Manual 2002, Indy 340 Deluxe Model #S02LD3AS, Rev. 01, pp. B5–B8.

Polaris Parts Manual 2002, Sport Touring, Model #S02SU5BS; Sport Touring ES Euro, Model #S02SD5BE, Rev. 02, B5–B8.

Polaris Parts Manual 2002, 800 SC SP F/O, Model #S02NP8CS, Built After Mar. 1, 2001, 800 SC SP M–10 F/O, Model #S02NE8CS; 800 SC SP Stock, Model #S02NP8CSA (B), pp. B10–B14, C1.

Polaris Parts Manual 2002, 800 XCR, Model #S02SB8AS, Rev. 01, pp. B9–B14, C1–C6.

European Search Report, May 27, 2004.

* cited by examiner

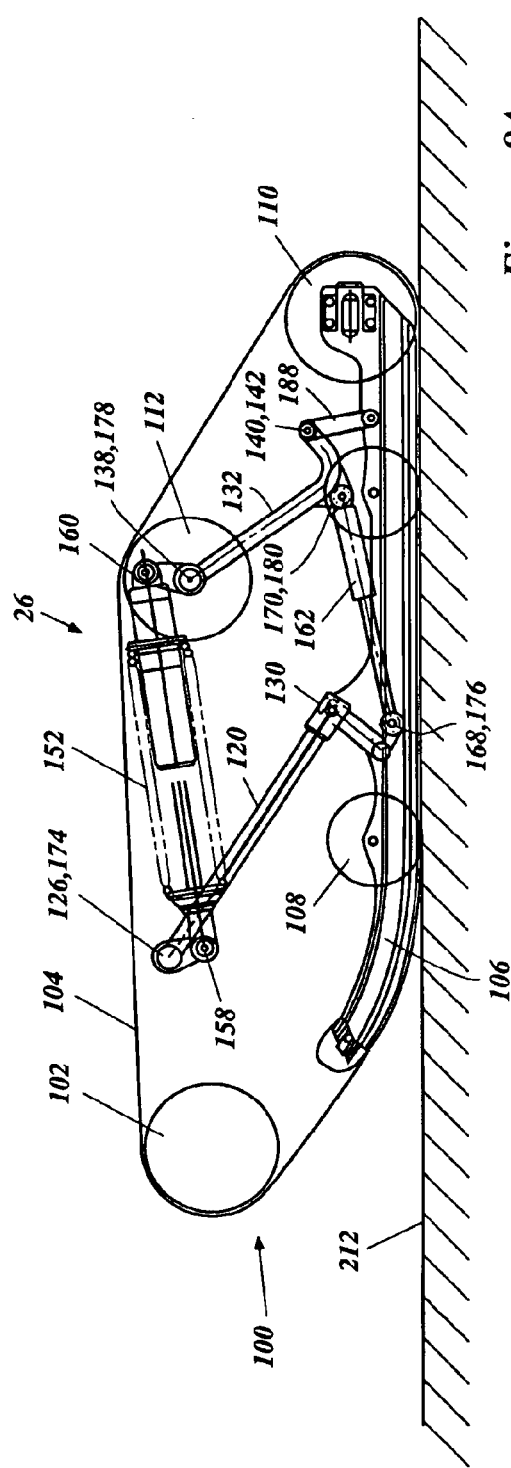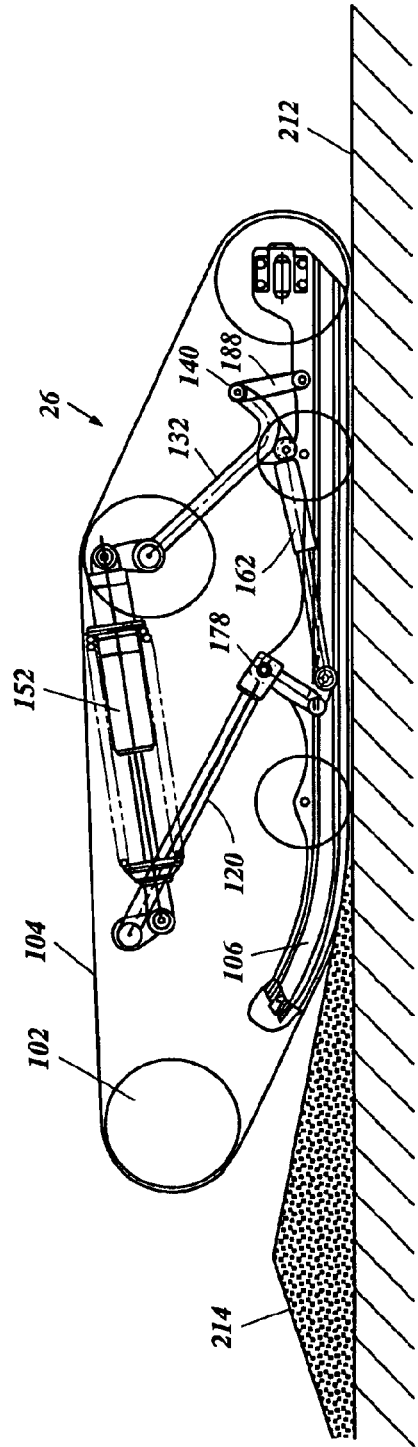

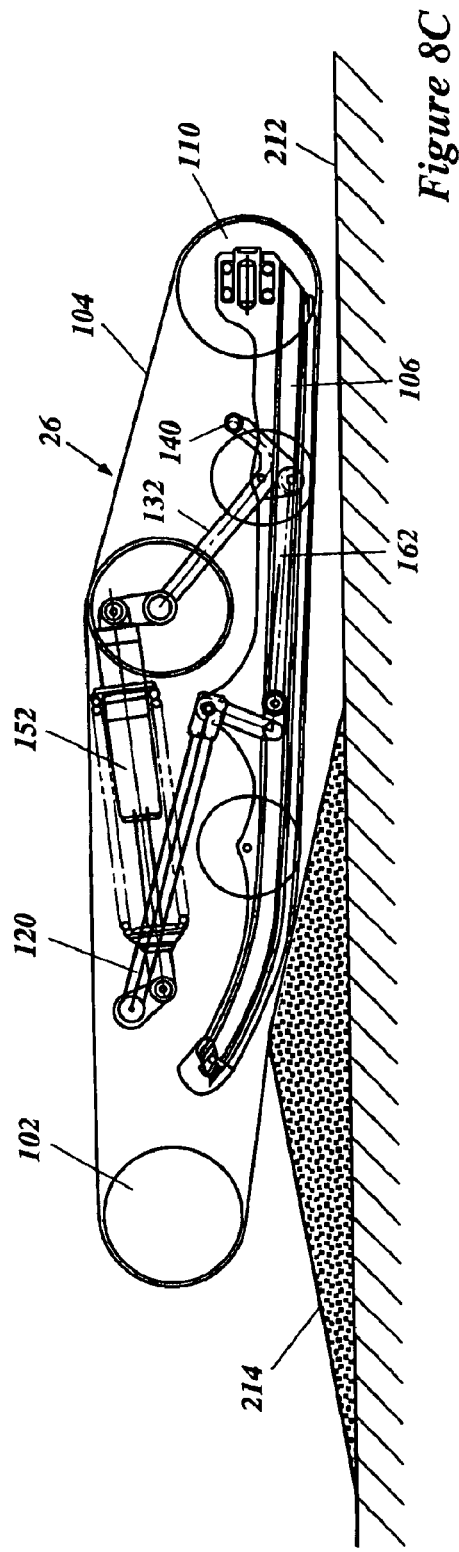
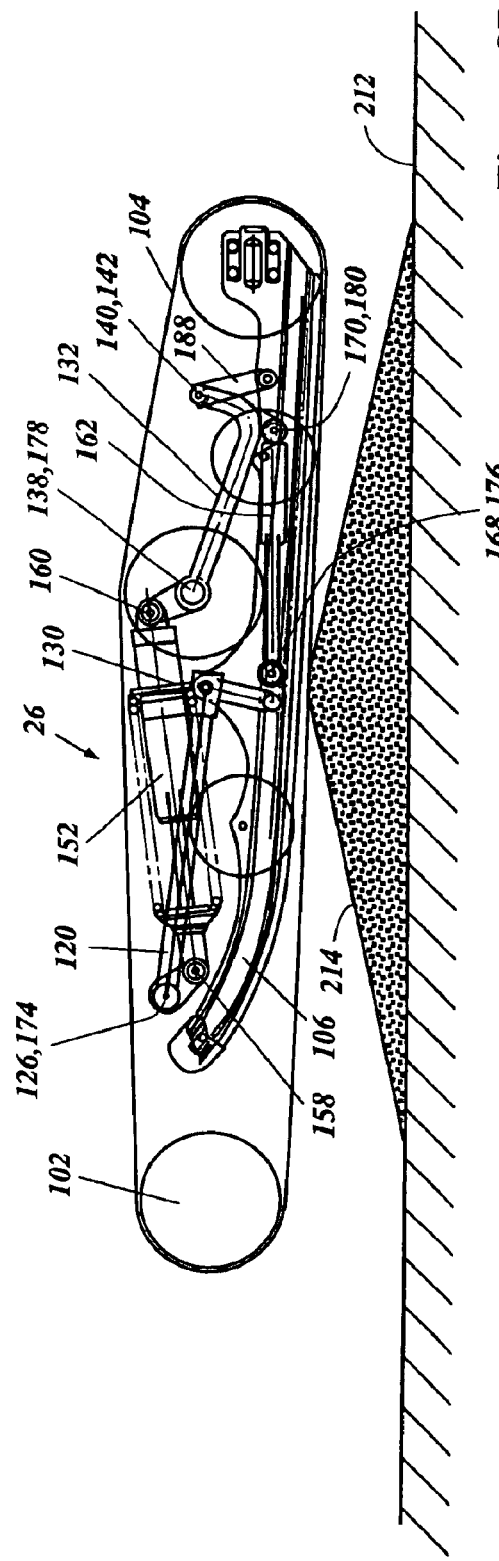

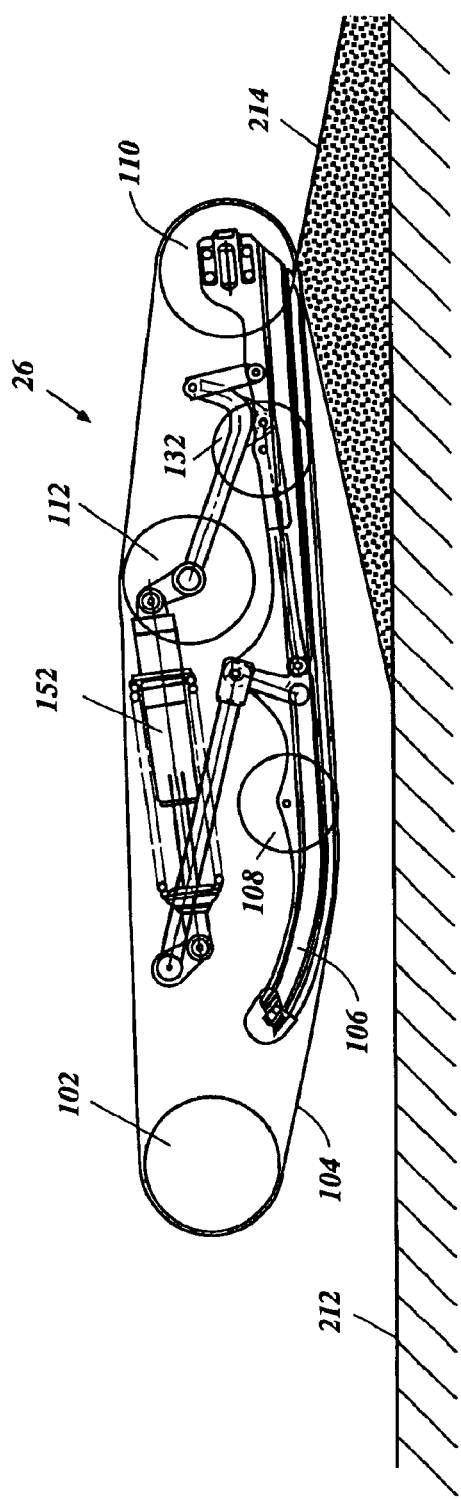
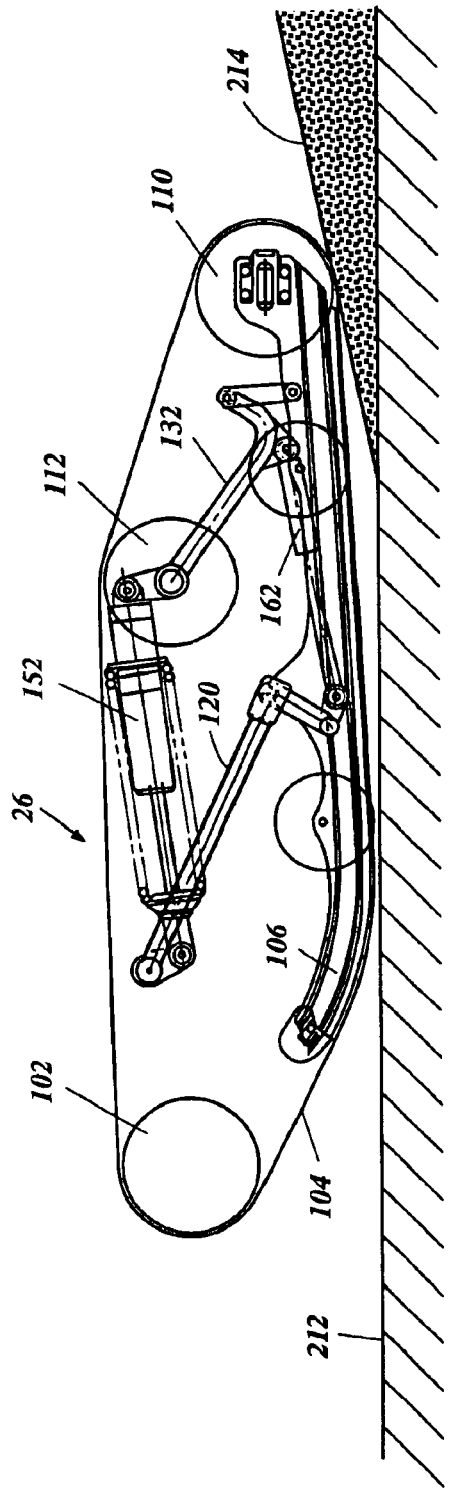

SNOWMOBILE SUSPENSION SYSTEM

RELATED APPLICATIONS

This application is based upon and claims the priority of Japanese Patent Application No. 2002-316917, filed on Oct. 31, 2002, which is hereby incorporated by reference in its entirety.

BACKGROUND OF THE INVENTION

1. Field of the Invention

The present application generally relates to suspension systems. More specifically, the present application relates to a suspension system for snowmobiles.

2. Description of the Related Art

Snowmobiles generally have a pair of right and left slide rails for guiding a drive track under a vehicle body frame. Suspension systems usually include shock absorbers and linkage mechanisms, including extendable members, interposed between the vehicle body frame and the slide rails so that the vertical distance between the body frame and the slide rails can increase and decrease. Some snowmobiles have rear suspension structures with four-node linkages that have generally parallelogram configurations.

Some snowmobile suspension systems have a relatively small four-node linkage positioned relatively close to the vehicle body frame, as shown in FIGS. 9A and 9B, which will be described later in connection with those Figures. When the distance between the vehicle body frame and the slide rails is reduced to the minimum, the four-node linkage is changed in shape from a parallelogram inclined rearward to a parallelogram slightly inclined forward. Since almost the whole four-node linkage is located inside the vehicle body frame and the parallelogram thereof is small in configuration, large forces are exerted on the nodes and the linkage members when the four-node linkage is contracted. Thus, the nodes and the linkage members must be suitably sized to provide the necessary strength. Also, the extendable length of the extendable member cannot be too large. Accordingly, the slide rails can only be adjusted through a small angle with respect to the vehicle body frame and the surface on which the snowmobile is running. Thus, it is difficult to keep these snowmobiles in a properly adjusted, stable condition while traveling.

In other snowmobile suspension systems, a four-node linkage has a relatively larger, generally parallelogram configuration, as shown in FIGS. 10A and 10B, which will be described later in connection with those Figures. When the distance between the vehicle body frame and the slide rails is reduced to the minimum, the four-node linkage is changed in shape until the parallelogram becomes almost flat (i.e., all of the linkages generally lie parallel to each other). In these snowmobile suspension systems, although the parallelogram of the four-node linkage is large, the sides of the parallelogram overlap in its most contracted state. Thus, in some instances, the four-node linkage does not compensate for pitching to an adequate extent to provide a comfortable ride.

SUMMARY OF THE INVENTION

One aspect of the invention disclosed herein includes the realization that snowmobile rear suspension systems can be improved by employing a four-node linkage with an improved quadrilateral configuration. The four-node linkage is sufficiently large to disperse loads. The four-node linkage maintains a quadrilateral configuration and can thus be extended and contracted in an optimum manner. The four-node linkage has a relatively simple and light structure.

Thus, in accordance with another aspect of the invention disclosed herein, a snowmobile comprises a vehicle body frame. At least one slide rail is disposed below the vehicle body frame. An extendable member is capable of being extended and contracted within a prescribed range. A front torque arm assembly has a plurality of coupling locations. The front torque arm assembly is coupled with the vehicle body frame at upper front coupling locations. The front torque arm is coupled with the extendable member at a lower front coupling location located generally below the upper front coupling location. The front torque arm is coupled with the at least one slide rail at an intermediate front coupling location located generally below the upper front coupling location and generally above the lower front coupling location. A rear torque arm has a plurality of coupling locations. The rear torque arm is coupled with the vehicle body frame at an upper rear coupling location. The rear torque arm is coupled with the extendable member at a lower rear coupling location located generally below the upper rear coupling location. The rear torque arm is coupled with the at least one slide rail. The vehicle body frame, the front torque arm, the rear torque arm, and the extendable member define a four-node linkage that provides for the vertical distance between the vehicle body frame and the at least one slide rail to vary.

In still another aspect, a snowmobile comprises a vehicle body frame. At least one slide rail is disposed below the vehicle body frame. An extendable member is capable of being extended and contracted within a prescribed range. A front torque arm has a plurality of coupling locations. The front torque arm is coupled with the vehicle body frame at one or more front frame coupling locations. The front torque arm is coupled with the at least one slide rail at a front rail coupling location. The front torque arm is coupled with the extendable member at a front member coupling location. The coupling locations are configured such that the front rail coupling location is located rearward of a plane passing through the one or more front frame coupling locations and the front member coupling location. A rear torque arm has a plurality of coupling locations. The rear torque arm is coupled with the vehicle body frame at one or more rear frame coupling locations. The rear torque arm is coupled with the at least one slide rail at a rear rail coupling location. The rear torque arm is coupled with the extendable member at a rear member coupling location. The vehicle body frame, the front torque arm, the rear torque arm, and the extendable member define a four-node linkage that provides for the vertical distance between the vehicle body frame and the at least one slide rail to vary.

In another aspect, a snowmobile comprises a vehicle body frame. At least one slide rail is disposed below the vehicle body frame. An extendable member is capable of being extended and contracted within a prescribed range. A front torque arm has a plurality of coupling locations. The front torque arm is coupled with the vehicle body frame at a front frame coupling location. The front torque arm is coupled with the at least one slide rail at a front rail coupling location. The front torque arm is coupled with the extendable member at a front member coupling location. A rear torque arm has a plurality of coupling locations. The rear torque arm is coupled with the vehicle body frame at a rear frame coupling location. The rear torque arm is coupled with the at least one slide rail at a rear rail coupling location. The rear torque arm is coupled with the extendable member at a rear member coupling location. The coupling locations are configured such that the front frame coupling location, the rear frame coupling location, the front member coupling location, and the rear member coupling location generally define the nodes of a quadrilateral shape. The front rail coupling location is located generally within the bounds of the quadrilateral shape.

In yet another aspect, a snowmobile comprises a vehicle body frame, a front torque arm, and a rear torque arm. At least one slide rail is disposed below the vehicle body frame. An extendable member is capable of being extended and contracted within a prescribed range. A means is provided for coupling together the vehicle body frame, the front torque arm, the rear torque arm, and the extendable member so as to define a four-node quadrilateral linkage system coupled with the at least one slide rail. The quadrilateral linkage system is capable of moving between a fully extended position and a fully contracted position while maintaining the quadrilateral shape in at least both the fully extended and fully contracted positions.

In another aspect, a snowmobile comprises a vehicle body frame, a first slide rail, and a second slide rail. The first and second slide rails are disposed below the vehicle body frame. A front torque arm assembly has an upper portion and a lower portion. The upper portion of the front torque arm assembly is coupled with the vehicle body frame. The lower portion of the front torque arm assembly is coupled with the first and second slide rails at front pivot locations. The front torque arm assembly is rotatable relative the first and second slide rails about the front pivot locations. A rear torque arm assembly has an upper portion and a lower portion. The upper portion of the rear torque arm assembly is coupled with the vehicle body frame. The lower portion of the rear torque arm assembly is coupled with the first and second slide rails at rear pivot locations. The rear torque arm assembly is rotatable relative the first and second slide rails about the rear pivot locations. A first protrusion extends from the lower portion of the front torque arm assembly. The first protrusion is integrally rotatable with the front torque arm assembly. The first protrusion extends below the front pivot locations. A second protrusion extends from the lower portion of the rear torque arm assembly. The second protrusion is integrally rotatable with the rear torque arm assembly. An extendable member has a first end and a second end. The first end of the extendable member is coupled with the first protrusion. The second end of the extendable member is coupled with the second protrusion. The extendable member is capable of being extended and contracted within a prescribed range.

In another aspect, a snowmobile comprises a vehicle body frame. At least one slide rail is disposed below the vehicle body frame. A front torque arm is coupled with the vehicle body frame at an upper front coupling location. The front torque arm is coupled with the at least one slide rail at a lower front coupling location located generally below the upper front coupling location. A rear torque arm is coupled with the vehicle body frame at an upper rear coupling location. The rear torque arm is coupled with the at least one slide rail at a lower rear coupling location located generally below the upper front coupling location. An extendable member has a first end and a second end. The first end is coupled with the front torque arm at a location near the lower front coupling location. The second end is coupled with the rear torque arm at a location near the lower rear coupling location.

BRIEF DESCRIPTION OF THE DRAWINGS

These and other features, aspects and advantages of the present invention will be better understood with reference to a preferred embodiment, which is illustrated in the accompanying drawings. The illustrated embodiment is merely exemplary and is not intended to define the outer limits of the scope of the present invention.

FIGS. 8A–8F are schematic side views of a portion of the suspension system of FIG. 2A traveling at an elevated speed, shown in multiple positions relative to a road surface;

DETAILED DESCRIPTION OF THE PREFERRED EMBODIMENT

Figure 1:
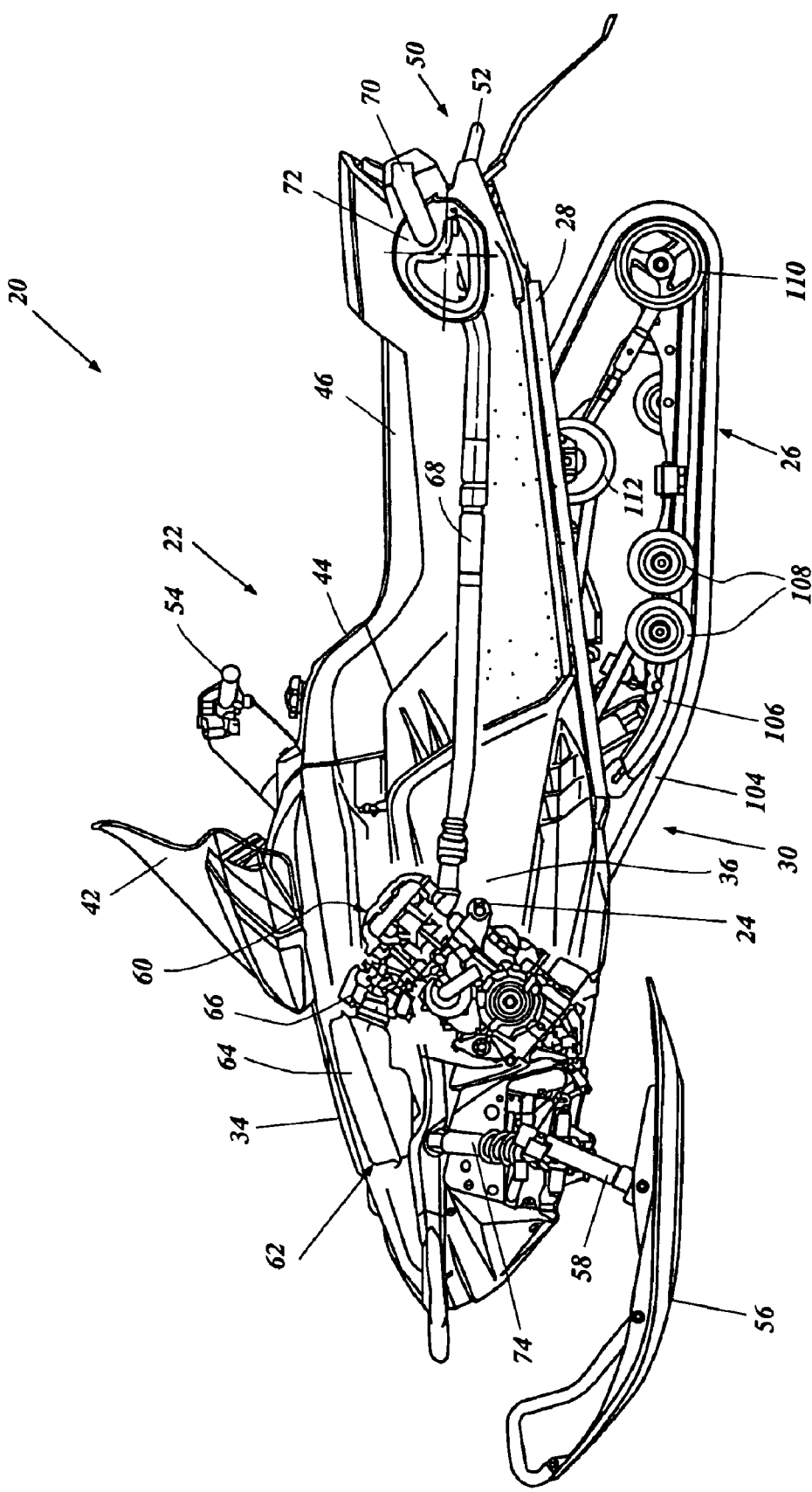
FIG. 1 is a side elevational view of a snowmobile with certain internal portions shown.

With reference to FIG. 1, a vehicle 20 having certain features, aspects and advantages of the present invention is described below. As shown in FIG. 1, the vehicle 20 is a snowmobile. A snowmobile is an application for which many features, aspects and advantages of the present invention provide particular advantages. Nevertheless, certain features, aspects and advantages of the present invention can be used with other vehicles 20.

As shown in FIG. 1, the vehicle 20 comprises a vehicle body 22, including a vehicle body frame 28, an internal combustion engine 24 mounted to the vehicle body 22, and drive system 30 coupled with a rear suspension system 26 mounted to the vehicle body frame 28.

The vehicle body 22 carries a number of other components of the vehicle 20. For example, a vehicle body cover 34 is disposed over the vehicle body 22. The vehicle body cover 34 defines, in part, an engine compartment 36 in which the engine 24 is mounted.

A windshield 42 is disposed over a mid-portion of the vehicle body cover 34. Rearward of the windshield 42, a fuel tank 44 is mounted to the vehicle body 22 in a manner that allows the vehicle body cover 34 and the fuel tank 44 to appear to blend together. A seat 46 is mounted to the vehicle body 22, rearward of the fuel tank 44. The seat 46 preferably is a saddle-type seat.

A grab bar 50 is disposed rearward from the seat 46. The grab bar 50 comprises a grabbing portion 52 that can be used to raise a rear portion of the vehicle 20 for turning and maneuvering when the vehicle 20 is not being ridden. The illustrated grab bar 50 is generally U-shaped and is mounted in a generally horizontal manner. However, other forms of grab bars can be used.

A steering handle assembly 54 is disposed forward of the seat 46 and the fuel tank 44. The steering handle assembly 54 can carry appropriate controls and can be coupled to a pair of front skis 56. Manipulation of the steering handle assembly 54 causes the direction of the vehicle 20 to be altered. The skis 56 are mounted to the vehicle body 22 through a front suspension assembly 58. Any suitable front suspension assembly 58 can be used. The front suspension assembly 58 preferably comprises front ski shock absorbers 74.

The engine 24 in the illustrated arrangement is a four-cycle, multi-cylinder engine mounted within the engine compartment 36. Of course, other types and sizes of engines can be used. The engine 24 has an engine body 60 that is supported on the vehicle body 22. An intake system 62 is configured to introduce air and fuel into the engine body 60. The intake system 62 comprises an air filter 64 and a carburetor 66. An exhaust system 68 is configured to discharge exhaust gases to the atmosphere after combustion in the engine 24. The exhaust system 68 comprises exhaust pipes 70 and a muffler 72.

The engine 24 drives a transmission system (not shown), which preferably is a continuously variable transmission. Other transmissions can also be used. The transmission system is coupled with the drive system 30. The drive system 30 comprises a drive shaft (not shown) coupled with the transmission system. The drive shaft powers a drive unit 100 (best shown in FIGS. 8A–8F). The drive unit 100 generally comprises one or more drive wheels 102 and a drive track 104. The drive wheel 102 provides a motive force to the drive track 104, which is commonly used in the vehicle industry.

With continued reference to FIG. 1, the drive track 104 is guided around a preferred path on first and second slide rails 106, a plurality of suspension wheels 108 and main rear suspension wheels 110. The slide rails 106 preferably support the suspension wheels 108 and the main rear suspension wheels 110.

An idler roller 112 preferably is mounted to the vehicle body 22 and is configured to help to define the preferred path for the drive track 104. A rear suspension 26 mounts these components to the vehicle body 22. The rear suspension system 26 will be described in greater detail below.

Many of the above-described components are generally conventional and can be arranged and configured in any suitable manner. Additionally, the above-described components can be replaced by other suitable components where desired. Any details omitted to this point have been considered well within the design knowledge of those of ordinary skill in the art.

Figure 2A:
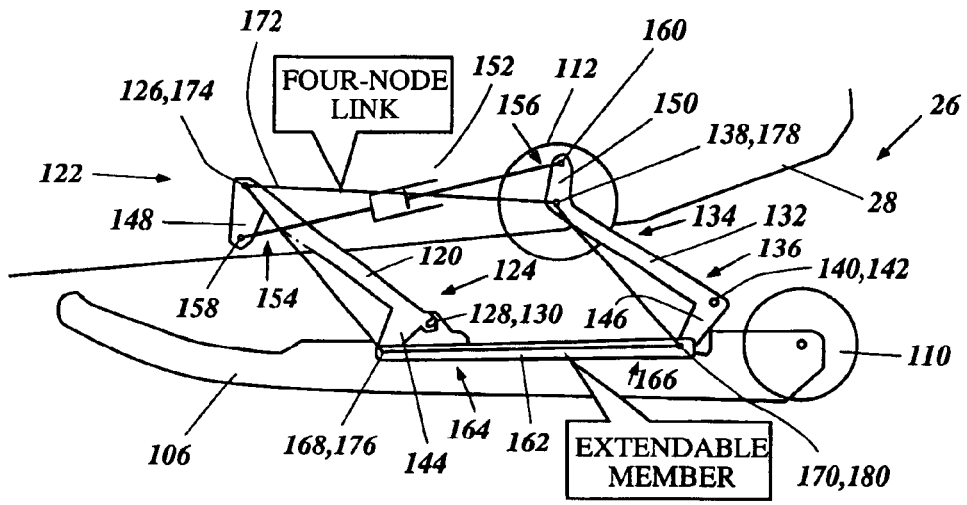
FIG. 2A is a schematic view of a suspension system according to one preferred embodiment of the present invention, shown in an expanded configuration.
Figure 2B:
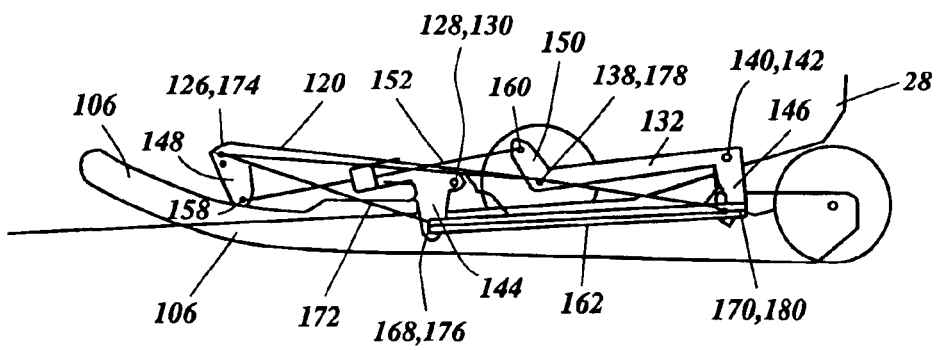
FIG. 2B is the suspension system of FIG. 2A shown in a contracted configuration.

FIGS. 2A and 2B further illustrate a rear suspension assembly for a snowmobile. FIGS. 2A and 2B illustrate the vehicle body frame 28. The first and second slide rails 106 are disposed generally below the vehicle body frame 28. As used herein, the terms "below" and "above" are relative terms, generally defining a vertical location lower than or higher than a reference location or structure associated with a vehicle in a generally upright orientation. The terms "below" and "above" do not necessarily indicate relationships that are directly beneath or directly over the reference location or structure.

A front torque arm assembly 120 has an upper portion 122 and a lower portion 124. The upper portion 122 of the front torque arm assembly 120 is pivotally coupled with the vehicle body frame 28. The upper portion 122 of the front torque arm assembly 120 preferably is coupled with the vehicle body frame 28 via a first shaft 126. As used herein, the terms "torque arm" and "torque arm assembly" can each refer to a single element and/or a combination of elements.

The lower portion 124 of the front torque arm assembly 120 is coupled with the first and second slide rails 106 at front pivot locations 128. The lower portion 124 of the front torque arm assembly 120 preferably is coupled with the first and second slide rails 106 via a second shaft 130 aligned with the front pivot locations 128. The front torque arm assembly 120 is rotatable relative the first and second slide rails 106 about the front pivot locations 128.

A rear torque arm assembly 132 has an upper portion 134 and a lower portion 136. The upper portion 134 of the rear torque arm assembly 132 is pivotally coupled with the vehicle body frame 28. The upper portion 134 of the rear torque arm assembly 132 preferably is coupled with the vehicle body frame 28 via a third shaft 138.

The lower portion 136 of the rear torque arm assembly 132 is coupled with the first and second slide rails 106 at rear pivot locations 140. The lower portion 136 of the rear torque arm assembly 132 preferably is coupled with the first and second slide rails 106 via a fourth shaft 142 aligned with the rear pivot locations 140. The rear torque arm assembly 132 is rotatable relative the first and second slide rails 106 about the rear pivot locations 140.

A first protrusion 144 extends from the lower portion 124 of the front torque arm assembly 120. The specific structure of the first protrusion 144 is shown in one preferred embodiment illustrated and described further below with reference to FIGS. 4–7. The first protrusion 144 is integrally rotatable with the front torque arm assembly 120. The first protrusion 144 extends below the front pivot locations 128. Preferably, the first protrusion 144 extends forward and downward relative the second shaft 130, at least when the suspension system 26 is unloaded. As used herein, the term "protrusion" can refer to a single element and/or a combination of elements that are integrally formed with or fixed to a "torque arm" or "torque arm assembly." Reference to a "torque arm" or "torque arm assembly" can include the "protrusions" integrally formed or fixed thereto.

The first protrusion 144 can be a single member that extends from the front torque arm assembly 120. In other embodiments, the first protrusion 144 can comprise a plurality of members. The first protrusion 144 can extend transversely between two portions of the front torque arm assembly 120, as illustrated in FIGS. 4–7. Alternatively, the first protrusion 144 can extend from one side of the front torque arm assembly 120. In some embodiments, the first protrusion 144 can comprise one member extending from one side of the front torque arm assembly 120 and another member extending from another side of the front torque arm assembly 120.

A second protrusion 146 extends from the lower portion 136 of the rear torque arm assembly 132. The specific structure of the second protrusion 146 is shown in one preferred embodiment illustrated and described further below with reference to FIGS. 4–7. The second protrusion 146 is integrally rotatable with the rear torque arm assembly 132. The second protrusion 146 extends below the rear pivot locations 140. The second protrusion 146 preferably extends downward and forwardly relative the fourth shaft 142, at least when the suspension system is unloaded.

The second protrusion 146 can be a single member that extends from the rear torque arm assembly 132. In other embodiments, the second protrusion 146 can comprise a plurality of members. The second protrusion 146 can extend transversely between two portions of the rear torque arm assembly 132, as illustrated in FIGS. 4–7. Alternatively, the second protrusion 146 can extend from one side of the rear torque arm assembly 132. In some embodiments, the second protrusion 146 can comprise one member extending from one side of the rear torque arm assembly 132 and another member extending from another side of the rear torque arm assembly 132.

A third protrusion 148 preferably extends from the upper portion 122 of the front torque arm assembly 120 as shown in the illustrated embodiment. The third protrusion 148 is integrally rotatable with the front torque arm assembly 120. The third protrusion 148 extends generally below the location where the front torque arm assembly 120 is coupled with the vehicle body frame 28. The third protrusion 148 preferably extends downward relative the first shaft 126, at least when the suspension system is unloaded.

A fourth protrusion 150 can extend from the upper portion 134 of the rear torque arm assembly 132 as illustrated in the embodiment of FIGS. 2A and 2B. The fourth protrusion 150 is integrally rotatable with the rear torque arm assembly 132. The fourth protrusion 150 extends generally above the location where the rear torque arm assembly 132 is coupled with the vehicle body frame 28. The fourth protrusion 150 preferably extends upward relative the third shaft 138, at least when the suspension system is unloaded.

As shown in FIGS. 2A and 2B, a shock absorber 152 has a first end 154 and a second end 156. The first end 154 of the shock absorber 152 is pivotally coupled with the third protrusion 148 and the second end 156 of the shock absorber 152 is pivotally coupled with the fourth protrusion 150. The first end 154 of the shock absorber 152 preferably is coupled with the third protrusion 148 via a fifth shaft 158. The second end 156 of the shock absorber 152 preferably is coupled with the fourth protrusion 150 via a sixth shaft 160.

An extendable member 162 has a first end 164 and a second end 166. The first end 164 of the extendable member 162 is pivotally coupled with the first protrusion 144 and the second end 166 of the extendable member 162 is pivotally coupled with the second protrusion 146. The first end 164 of the extendable member 162 preferably is coupled with the first protrusion 144 via a seventh shaft 168. The second end 166 of the extendable member 162 preferably is coupled with the second protrusion 146 via an eighth shaft 170.

The extendable member 162 is capable of being extended and contracted within a prescribed range. The extendable member 162 can comprise a cylinder assembly. The cylinder assembly preferably comprises, for example, a rod that can slide relative to a cylinder, such that the extendable member 162 can be extended and contracted in a telescoping fashion within a certain range. Preferably, the range of expansion and contraction of the extendable member 162 limits the vertical range that the first and second slide rails 106 can move relative the vehicle body frame 28.

The vehicle body frame 28, the front torque arm assembly 120, the rear torque arm assembly 132, and the extendable member 162 define a four-node linkage 172 for increasing or decreasing the vertical distance between the vehicle body frame 28 and the first and second slide rails 106. The four-node linkage 172 comprises a first node 174 defined by the first shaft 126 that couples the vehicle body frame 28 with the front torque arm assembly 120. A second node 176 is defined by the seventh shaft 168 that couples the front torque arm assembly 120 with the extendable member 162. A third node 178 is defined by the third shaft 138 that couples the vehicle body frame 28 with the rear torque arm assembly 132. A fourth node 180 is defined by the eighth shaft 170 that couples the rear torque arm assembly 132 with the extendable member 162.

The four-node linkage 172 has a fully expanded configuration, as shown in FIG. 2A, for maximizing the vertical distance between the vehicle body frame 28 and the first and second slide rails 106. The first node 174, the second node 176, the third node 178, and the fourth node 180 preferably are positioned in a quadrilateral arrangement in the fully expanded configuration.

The four-node linkage 172 has a fully contracted configuration, as shown in FIG. 2B, for minimizing the vertical distance between the vehicle body frame 28 and the first and second slide rails 106. The first node 174, the second node 176, the third node 178, and the fourth node 180 preferably are positioned in a quadrilateral arrangement in the fully contracted configuration. As shown in FIG. 2B, the seventh shaft 168, corresponding to the second node 176, is located below the second shaft 130, thereby allowing the four-node linkage 172 to maintain a quadrilateral arrangement in the fully contracted configuration. The four-node linkage 172 maintains a quadrilateral arrangement in the fully contracted configuration and thus is able to better maintain strength and control pitching.

The four-node linkage 172 preferably has a plurality of intermediate configurations between the fully expanded configuration and the fully contracted configuration for varying the vertical distance between the vehicle body frame 28 and the first and second slide rails 106. The first node 174, the second node 176, the third node 178, and the fourth node 180 preferably are positioned in a quadrilateral arrangement in each of the plurality of intermediate configurations.

As described previously, the front torque arm assembly 120 has a plurality of coupling locations. The front torque arm assembly 120 is coupled with the vehicle body frame 28 at one or more front frame coupling locations. The front torque arm 120 is also coupled with the at least one slide rail 106 at a front rail coupling location. The front torque arm 120 is coupled with the extendable member 162 at a front member coupling location. The coupling locations are configured such that the front rail coupling location is located rearward of a plane passing through the one or more front frame coupling locations and the front member coupling location.

As shown in the illustrated embodiment, the rear torque arm assembly 132 has a plurality of coupling locations. The rear torque arm 132 is coupled with the vehicle body frame 28 at one or more rear frame coupling locations. The rear torque arm 132 is also coupled with the at least one slide rail 106 at a rear rail coupling location. The rear torque arm 132 is coupled with the extendable member 162 at a rear member coupling location. The coupling locations of the rear torque arm 132 are configured such that the rear rail coupling location is located rearward of a plane passing through the one or more rear frame coupling locations and the rear member coupling location.

As illustrated in FIGS. 2A and 2B, the torque arm assemblies 120, 132 are configured such that the front frame coupling location, the rear frame coupling location, the front member coupling location, and the rear member coupling location generally define the nodes of a quadrilateral shape. The front rail coupling location is located generally within the bounds of the quadrilateral shape. The rear rail coupling location is located generally outside the bounds of the quadrilateral shape.

Figure 6:
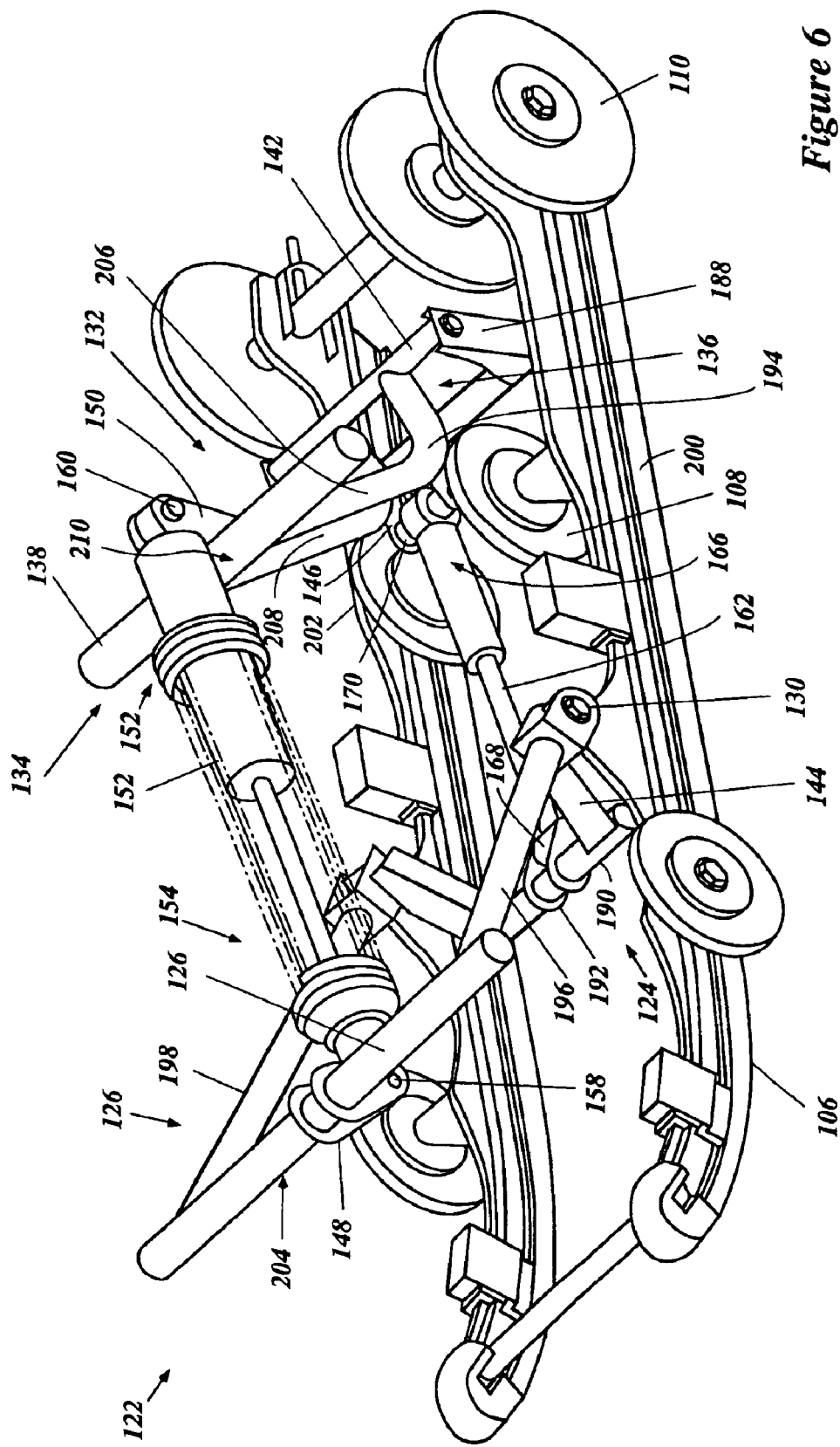
FIG. 6 is a front perspective view of a portion of the suspension system of FIG. 2A.

The extendable member 162 preferably is a single element disposed between the first protrusion 144 and the second protrusion 146. The extendable member 162 preferably is located generally between the first and second slide rails 106 and below the second and fourth shafts 130, 142 (as best shown in FIG. 6). Additionally, a single shock absorber 152 preferably is disposed between the third protrusion 148 and the fourth protrusion 150 and located generally between the first and second slide rails 106. Embodiments having a single element extendable member 162 and a single shock absorber 152 have a simplified structure, which can reduce costs.

In other embodiments, the extendable member 162 can comprise a plurality of elements, such as, for example, a first element extending generally along the first slide rail and a second element extending generally along the second slide rail. Additionally, in some embodiments, the extendable member 162 can also comprise a shock absorber. For example, a shock absorber, such as a hydraulic cylinder shock absorber or a rubber damper that can be expanded and contracted within a certain range, can be provided between the first protrusion 144 and the second protrusion 146. Embodiments having an extendable member 162 comprising a shock absorber further simplify the design by combining features in a single structure, thereby reducing the number of system components.

Figure 3:
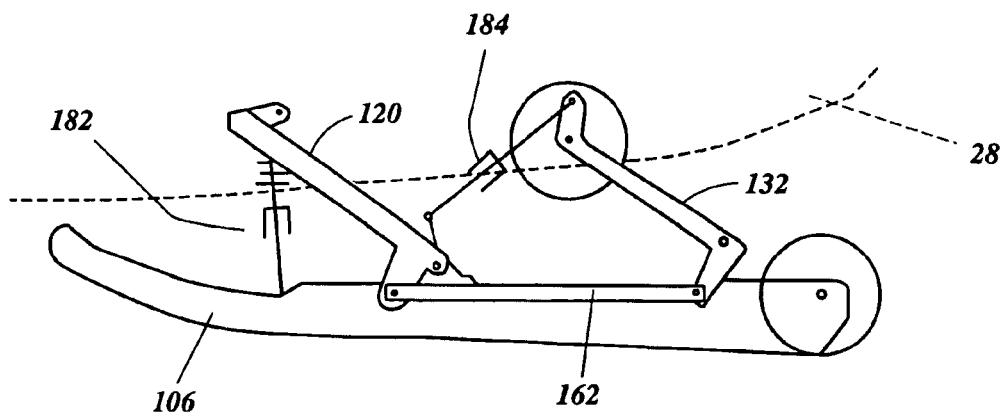
FIG. 3 is a schematic view of a modification of the suspension system of FIG. 2A, in accordance with another preferred embodiment of the present invention.

FIG. 3 illustrates an embodiment similar to the embodiment shown in FIGS. 2A and 2B. FIG. 3 illustrates that a first individual shock absorber 182 can be coupled to the front torque arm assembly 120 and that a second individual shock absorber 184 can be coupled to the rear torque arm assembly 132. The embodiment illustrated in FIG. 3 is similar to that shown in FIGS. 2A and 2B, in that it has a four-node linkage with the same basic configuration as shown in the embodiment of FIGS. 2A and 2B. The embodiment of FIG. 3 has first and second individual shock absorbers 182, 184 rather than a single shock absorber 152 as illustrated in FIGS. 2A and 2B.

The first individual shock absorber 182 preferably acts to bias the vehicle body frame away from the slide rails. The first individual shock absorber 182 preferably is coupled with the front torque arm assembly 120 and either directly to the slide rails or to a shaft extending between the slide rails. The second individual shock absorber 184 also preferably acts to bias the vehicle body frame away from the slide rails. The second individual shock absorber 184 preferably is coupled with the rear torque arm assembly 132 and either directly to the slide rails or to a shaft extending between and supported above the slide rails.

Figure 4:
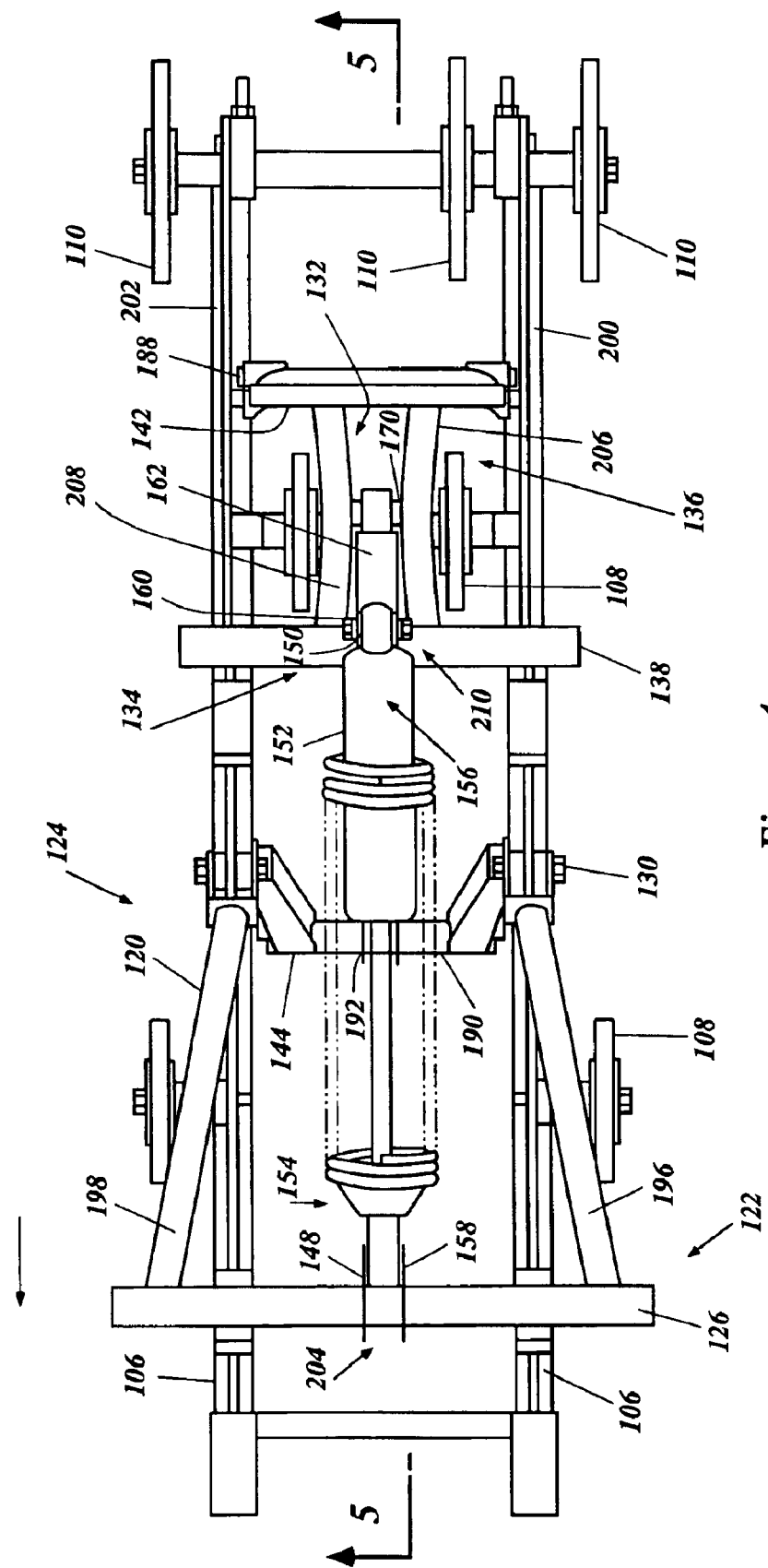
FIG. 4 is a top plan view of a portion of the suspension system of FIG. 2A.
Figure 5:
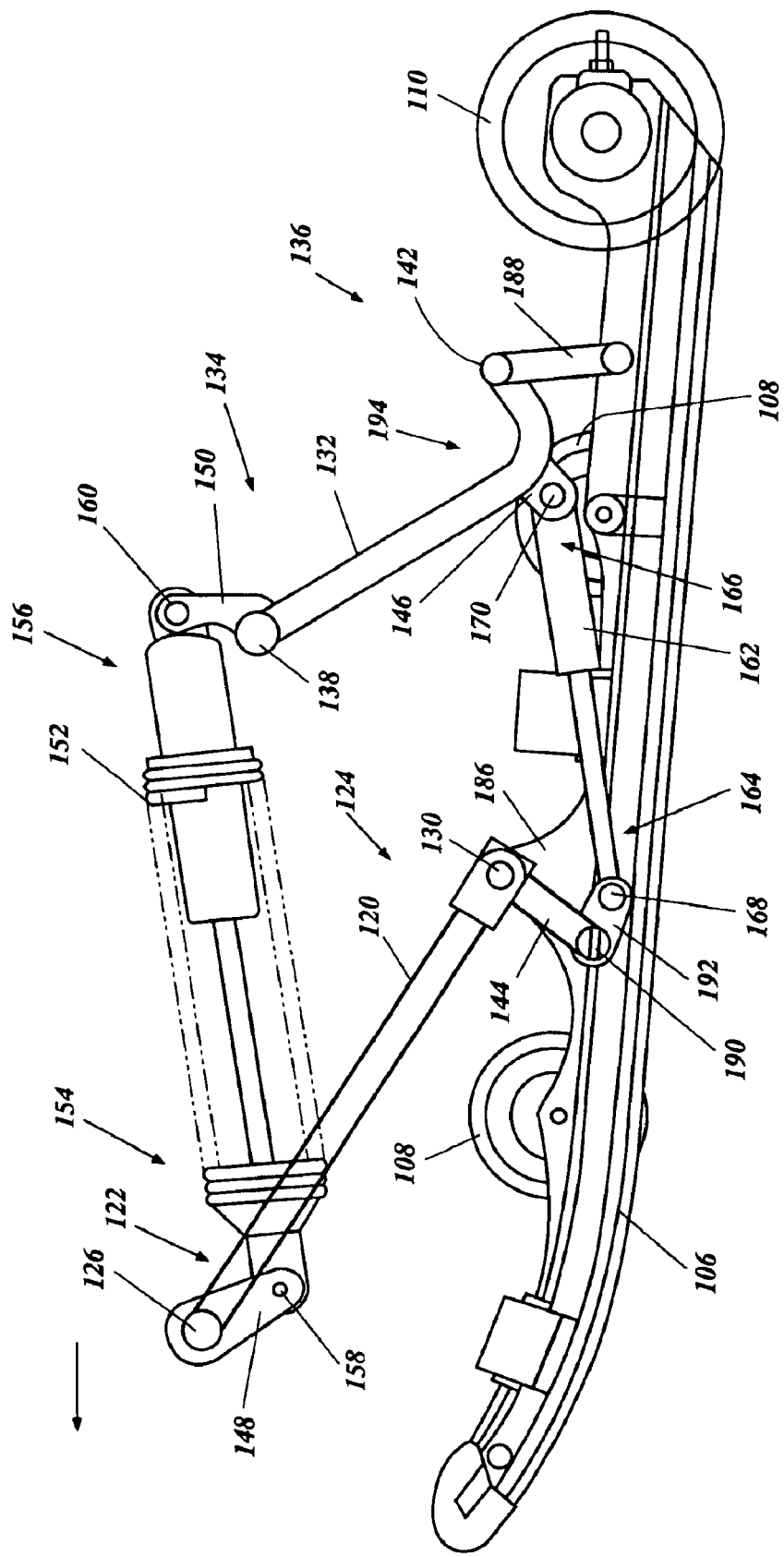
FIG. 5 is a side elevational view of a portion of the suspension system of FIG. 2A as sectioned along the line 5—5 shown in FIG. 4.

FIGS. 4–7 illustrate portions of the rear suspension system 26 as described with respect to the embodiment of FIGS. 2A and 2B. As shown in FIG. 5, the third protrusion 148 extends from the upper portion 122 of the front torque arm assembly 120. The first end 154 of the shock absorber 152 is pivoted on the fifth shaft 158 at an end of the third protrusion 148.

As described previously, the lower portion 124 of the front torque arm assembly 120 is coupled with the first and second slide rails 106. The first and second slide rails 106 comprise a first raised support portion 186 for connecting with the front torque arm assembly 120 via the second shaft 130. The first protrusion 144 is integral with the front torque arm assembly 120 and extends forward and downward from the second shaft 130. As shown in FIGS. 4–7, the first protrusion 144 comprises a ninth shaft 190 that is movable integrally with the front torque arm assembly 120. The ninth shaft 190 comprises an extension element 192 that is also movable integrally with the front torque arm assembly 120. The extension element 192 is pivotally coupled with the first end 164 of the extendable member 162 via the seventh shaft 168, which is located at an end of the extension element 192 of the first protrusion 144.

The lower portion 136 of the rear torque arm assembly 132 includes a curved portion 194. As shown in FIG. 5, the second protrusion 146 extends from the curved portion 194. The second protrusion 146 is pivotally coupled with the second end 166 of the extendable member 162 via the eighth shaft 170, which is located at an end of the second protrusion 146. The first and second slide rails 106 each comprise a second raised support portion 188 for connecting with the rear torque arm assembly 132 via the fourth shaft 142. An end of the curved portion 194 of the rear torque arm assembly 132 is pivotally coupled to the fourth shaft 142.

The fourth protrusion 150 extends from the upper portion 134 of the rear torque arm assembly 132. The second end 156 of the shock absorber 152 is pivotally connected to the sixth shaft 160 at an end of the fourth protrusion 150. As shown in FIG. 4, the shock absorber 152 is located between the first and second slide rails 106 and the extendable member 162 is located below the shock absorber 152.

Figure 7:
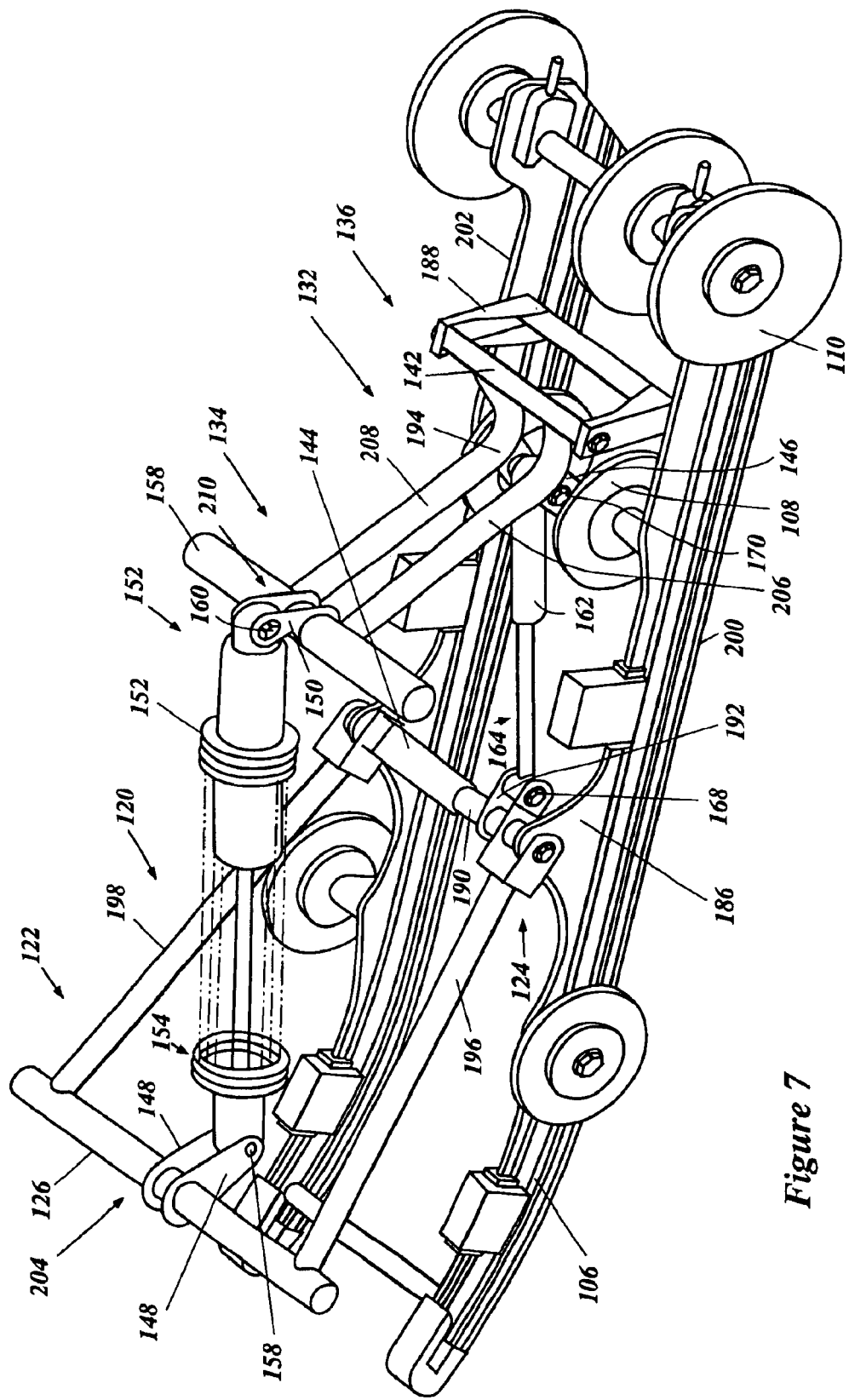
FIG. 7 is a rear perspective view of a portion of the suspension system of FIG. 2A.

As shown in FIGS. 4, 6 and 7, the front torque arm assembly 120 has a first side element 196 and a second side element 198. The first and second side elements 196, 198 extend from the lower portion 124 to the upper portion 122 of the front torque arm assembly 120. The first side element 196 is pivotally coupled with the first slide rail 200. The second side element 198 is pivotally coupled with the second slide rail 202. The first and second side elements 196, 198 of the front torque arm assembly 120 are coupled to the first shaft 126. Portions of the first and second side elements 196, 198 and the first shaft 126 generally form the upper portion 122 of the front torque arm assembly 120. The third protrusion 148 extends from a middle portion 204 of the first shaft 126. The third protrusion 148 can be an integral part of the first shaft 126, or can be a separate part that is fixed, for example, welded, to the first shaft 126. The first end 154 of the shock absorber 152 is pivotally coupled to the third protrusion 148 as described previously.

As shown in FIGS. 4, 6 and 7, on the lower portion 124 of the front torque arm assembly 120, the extension element 192 of the first protrusion 144 extends from the middle of the ninth shaft 190, between first and second side elements 196, 198 of the first protrusion 144. The extension element 192 can be an integral part of the ninth shaft 190, or can be a separate part that is fixed, for example, welded, to the ninth shaft 190. The first end 164 of the extendable member 162 is pivotally coupled to the extension element 192 such that rotation of the seventh shaft 168 moves the first end 164 through an arcuate path.

The rear torque arm assembly 132 has a first side element 206 and a second side element 208. The first and second side elements 206, 208 extend from the lower portion 136 to the upper portion 134 of the rear torque arm assembly 132. The first and second side elements 206, 208 of the rear torque arm assembly 132 are coupled at the lower portion 136 of the rear torque arm assembly 132 via the fourth shaft 142. The first and second side elements 206, 208 of the rear torque arm assembly 132 are coupled to the third shaft 138. Portions of the first and second side elements 206, 208 and the third shaft 138 form the upper portion 134 of the rear torque arm assembly 132. The fourth protrusion 150 extends from a middle portion 210 of the third shaft 138. The fourth protrusion 150 can be an integral part of the third shaft 138, or can be a separate part that is fixed, for example, welded, to the third shaft 138. The second end 156 of the shock absorber 152 is pivotally coupled to the fourth protrusion 150 as described previously.

The second end 166 of the extendable member 162 is pivotally coupled to the eighth shaft 170 at the end of the second protrusion 146 extending from the curved portions 194 of the rear torque arm assembly 132. The curved portion 194 of the rear torque arm assembly 132 allows the rear torque arm assembly 132 to be supported on the first and second slide rails 106 at locations along the rails generally between the plurality of suspension wheels 108 and the main rear suspension wheels 110.

As described above, the extendable member 162 has a first end and a second end. The first end of the extendable member 162 preferably is coupled with the front torque arm 120 at a location near the lower front coupling location where the front torque arm 120 is coupled with the first and second slide rails 106. The second end of the extendable member 162 preferably is coupled with the rear torque arm 132 at a location near the lower rear coupling location where the rear torque arm 132 is coupled with the first and second slide rails 106.

FIGS. 8A–8F illustrate portions of the rear suspension system 26 as described with respect to the embodiment of FIGS. 2A and 2B, shown in various positions of use relative a riding surface. FIG. 8A illustrates the rear suspension 26 of the embodiment of FIGS. 2A and 2B where the snowmobile is running on a flat road surface 212 at a relatively higher speed. The rear suspension 26 is shown in the fully expanded configuration. The one or more drive wheels 102 drive the drive track 104. The structure of the four-node linkage 174, including the vehicle body frame 28, the front torque arm assembly 120, the rear torque arm assembly 132, and the extendable member 162 are arranged as described previously. Additionally, the shock absorber 152 is mounted and arranged as described previously. In the illustrated arrangement, the four nodes 174, 176, 178, 180 are in a quadrilateral configuration.

As shown in FIG. 8A, the shock absorber 152 in the illustrated embodiment is oriented such that a rear portion of the shock absorber 152 is generally more elevated than a front portion of the shock absorber. The shock absorber 152 biases the front torque arm assembly 120 away from the vehicle body frame 28. The shock absorber 152 also biases the rear torque arm assembly 132 away from the vehicle body frame 28. Accordingly, while traveling along a generally flat riding surface, the shock absorber 152 biases the rear suspension system 26 toward a fully expanded configuration. The relative positions of the ends of the shock absorber 152 can of course be reversed to provide similar biasing of these elements.

Additionally, as shown in FIG. 8A, the extendable member 162 is oriented such that a rear portion of the extendable member 162 is generally more elevated than a front portion of the extendable member 162. The extendable member 162 allows for relative motion between the front torque arm assembly 120 and the rear torque arm assembly 132 to compensate for pitching of the first and second slide rails 106. The extendable member 162 is biased toward an expanded position.

FIG. 8B shows the rear suspension 26 as it initially encounters a bump 214 on the road surface 212. As the rear suspension 26 encounters the bump 214, the first and second slide rails 106 move slightly upward toward the vehicle body frame 28. As the first and second slide rails 106 are raised, the front torque arm assembly 120 rotates in a counterclockwise direction about the front pivot locations 128 on the first and second slide rails 106. Counterclockwise rotation of the front torque arm assembly 120 places the shock absorber 152 in compression. Additionally, counterclockwise rotation of the front torque arm assembly 120 causes the extendable member 162 to contract. The rear torque arm assembly 132 is shown slightly rotated in a counterclockwise direction about rear pivot locations 140 on the first and second slide rails 106.

FIG. 8C shows the front portion of the rear suspension 26 running onto the bump 214. Since the snowmobile is running at high speed, the shock absorber 152 is further compressed as the slide rails 106 travel over the bump 214 and the rear suspension 26 contracts upward. As the first and second slide rails 106 move further toward the vehicle body frame 28, the front torque arm assembly 120 rotates further in the counterclockwise direction about the front pivot locations 128. This rotation causes the shock absorber 152 to compress further. Additionally, counterclockwise rotation of the front torque arm assembly 120 causes the extendable member 162 to contract further. The rear torque arm assembly 132 is rotated further in a counterclockwise direction about rear pivot locations 140. The second raised support portion 188 of the first and second slide rails 106 for connecting with the rear torque arm assembly 132 is not shown in FIG. 8C.

FIG. 8D shows the rear suspension 26 at a point where the approximate center of the rear suspension 26 has passed over the bump 214. At this time, the rear suspension 26 is shown in the fully contracted state. As the rear suspension 26 passes over the bump 214 at an elevated speed, the rear suspension 26, in the fully contracted configuration, is in a generally horizontal orientation. The shock absorber 152 is further compressed as the rear suspension 26 contracts upward. The first and second slide rails 106 move further toward the vehicle body frame 28. The front torque arm assembly 120 rotates further in the counterclockwise direction about the front pivot locations 128 until the front torque arm assembly 120 is almost in a generally horizontal orientation. This rotation causes the shock absorber 152 to compress further. Additionally, the counterclockwise rotation of the front torque arm assembly 120 causes the extendable member 162 to contract further. The rear torque arm assembly 132 is rotated further in a counterclockwise direction about rear pivot locations 140 until the rear torque arm assembly 132 is almost in a generally horizontal orientation.

As described before, the front torque arm assembly 120 and the rear torque arm assembly 132 are pressed from below by the bump 214 until they are positioned in generally horizontal orientations. However, even in the fully contracted configuration, the seventh shaft 168 (node 176) is still located below the second shaft 130, so that the four-node linkage extending between nodes 174, 176, 178, and 180 does not become flat. The nodes 174, 176, 178, and 180 keep a quadrilateral configuration. This ensures strength and effectively reduces vehicle pitching. The snowmobile is also more comfortable to ride because it is generally kept in a horizontal position.

FIG. 8E shows the rear portion of the rear suspension 26 having almost passed completely over the bump 214. Since the snowmobile is running at high speed, the front portion of the rear suspension 26 is still shown off the ground. The shock absorber 152 biases the front torque arm assembly 120 away from the vehicle body frame 28. The shock absorber 152 also biases the rear torque arm assembly 132 away from the vehicle body frame 28. Accordingly, as the rear suspension 26 clears the bump 214, the shock absorber 152 biases the rear suspension system 26 toward a fully expanded configuration.

As the rear suspension 26 passes the bump 214, the biasing force of the shock absorber 152 in compression causes the front torque arm assembly 120 to rotate in a clockwise direction about the front pivot locations 128 on the first and second slide rails 106. The biasing force of the shock absorber 152 in compression also causes the rear torque arm assembly 132 to rotate in a clockwise direction about the rear pivot locations 140 on the first and second slide rails 106. Rotation of the front and rear torque arm assemblies 120, 132 in the clockwise direction causes the first and second slide rails 106 to move slightly downward away from the vehicle body frame 28. Additionally, clockwise rotation of the front and rear torque arm assemblies 120, 132 causes the extendable member 162 to extend slightly.

FIG. 8F shows the rear suspension 26 after it has completely passed over the bump 214. The front portion of the rear suspension 26 has landed on the road surface 212. The shock absorber 152 acts to extend the rear suspension 26 vertically to the fully expanded configuration as described generally with reference to FIG. 8E. Additionally, the extendable member 162 is returned to its fully extended configuration.

As illustrated in FIGS. 1–8, the four-node linkage 172 preferably has a relatively large configuration, such that the load exerted on each part of the linkage structure is decreased. Thus, embodiments can include rear suspension systems 26 with reduced weight and reduced costs compared with some known rear suspension systems such as the type described below with reference to FIGS. 9A and 9B.

Figure 9A:
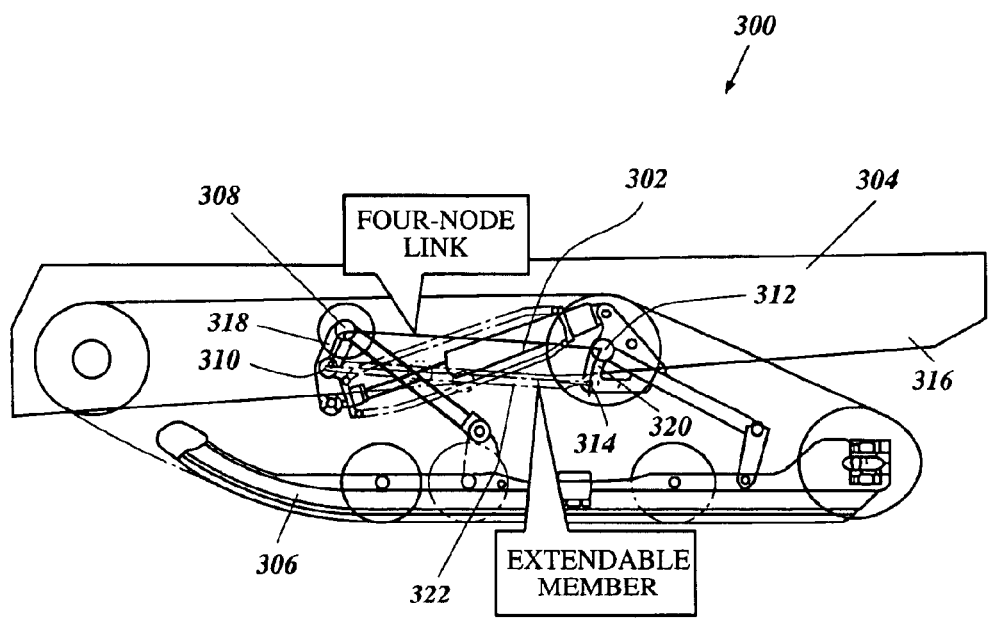
FIG. 9A is a schematic view of a known suspension system in an expanded configuration.
Figure 9B:
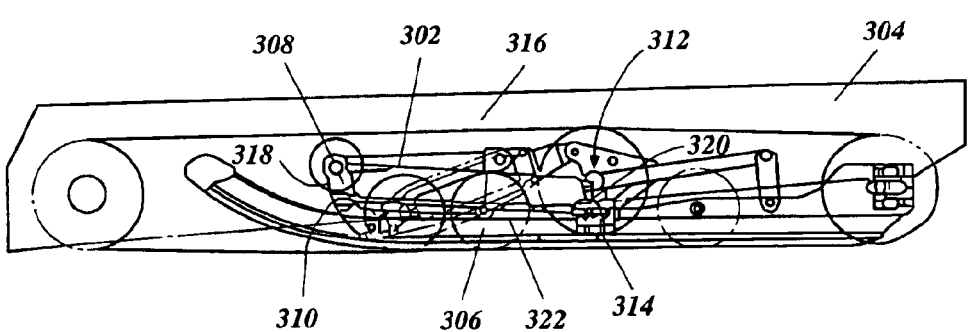
FIG. 9B is the suspension system of FIG. 9A shown in a contracted configuration.

FIGS. 9A and 9B illustrate a known rear suspension system 300. The system 300 has a relatively small four-node linkage 302 positioned relatively close to the vehicle body frame 304. When the distance between the vehicle body frame 304 and the slide rails 306 is reduced to the minimum, the four-node linkage 302 is changed in shape from a parallelogram inclined rearward to a parallelogram slightly inclined forward. Since almost the whole four-node linkage 302 is located inside the vehicle body frame 304 and the parallelogram thereof is small in configuration, large forces are exerted on the nodes 308, 310, 312, 314 and the linkage members when the four-node linkage 302 is contracted. Thus, the nodes 308, 310, 312, 314 and the linkage members 316, 318, 320, 322 must be strong enough to withstand the loads. Typically this requires manufacturing the components with generally heavy materials, or providing complicated braces or supports to reinforce the structure of the linkage members and nodes. Also, the extendable length of the extendable member 322 cannot be large. Accordingly, the slide rails can only be adjusted through a small angle with respect to the vehicle body frame 304 and the surface on which the snowmobile is running. Thus, the vehicle noticeably pitches as it travels.

Additionally, as illustrated in FIGS. 1–8, since the four-node linkage 172 keeps a quadrilateral configuration even in its most contracted state, the rear suspension 26 exhibits sufficient strength, can ensure a comfortable ride, and reduces pitching within a practical range when compared with some known rear suspension systems such as the type described below with reference to FIGS. 10A and 10B.

Figure 10A:
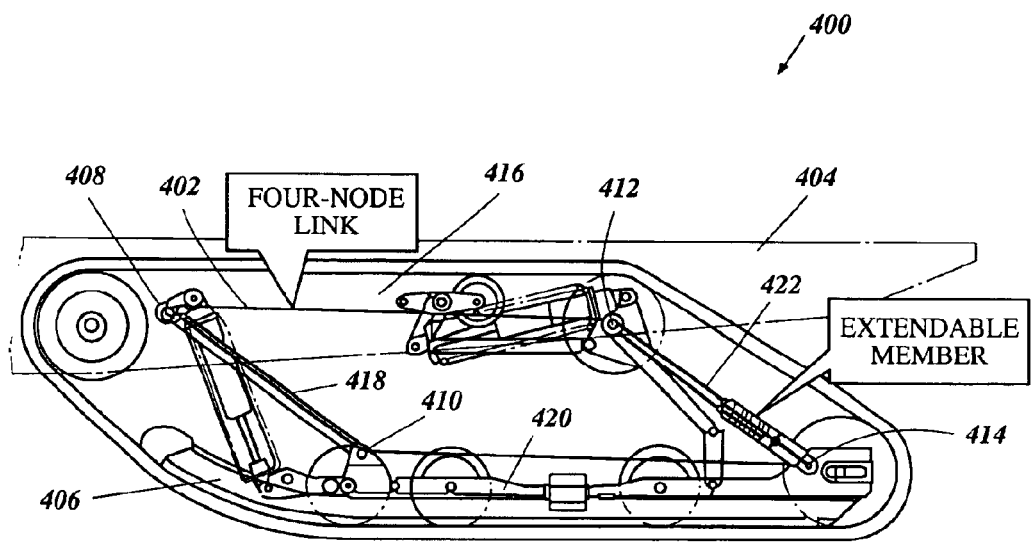
FIG. 10A is a schematic view of another known suspension system in an expanded configuration.
Figure 10B:
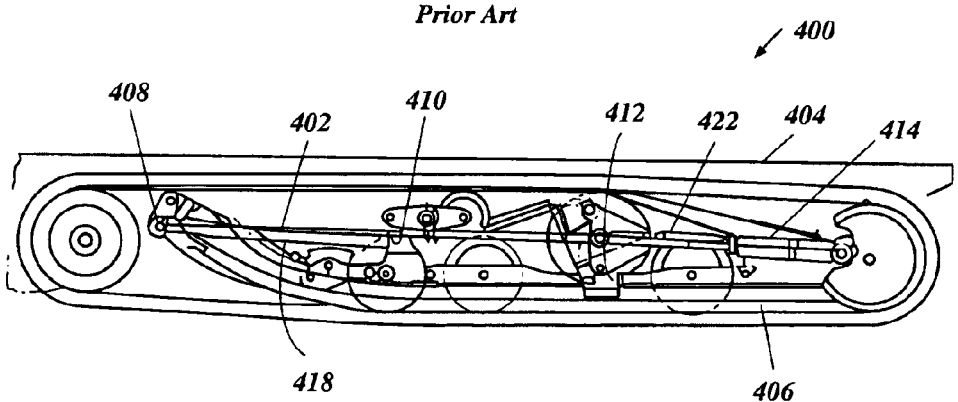
FIG. 10B is the suspension system of FIG. 10A shown in a contracted configuration.

FIGS. 10A and 10B illustrate another known rear suspension system 400. The system 400 includes a four-node linkage 402 that has a relatively larger, generally parallelogram configuration. However, when the distance between the vehicle body frame 404 and the slide rails 406 is reduced to the minimum, the four-node linkage 402 is changed in shape until the parallelogram becomes flat. Although the parallelogram of the four-node linkage 402 is large, in its most contracted state the nodes of the four-node linkage are configured to fall generally within the same substantially horizontal plane. As shown in FIGS. 10A and 10B, nodes 408, 410, 412, 414 and linkage members 416, 418, 420, 422 extend generally along the same substantially horizontal plane in the collapsed configuration. Thus, the four-node linkage 402, in the contracted configuration, is no longer capable of compensating for changes in the pitch of the rails. Any changes in the pitch of the rails will be transmitted directly to the vehicle body.

According to some preferred embodiments of the present invention shown in FIGS. 1–8, the four-node linkage 172 preferably has a relatively large configuration, such that the load exerted on each part of the linkage structure is decreased. Thus, embodiments can include rear suspension systems 26 with reduced weight and reduced costs. Also, since the four-node linkage 172 keeps a quadrilateral configuration even in its most contracted state, the rear suspension 26 exhibits sufficient strength and can ensure a comfortable ride. In addition, the rear suspension 26 moderately reduces pitching within a practical range.

In embodiments where a single extendable member 162 is provided below the second and fourth shafts 160, 142 disposed at the lower portions 124, 136 of the front and rear torque arms 120, 132 and between the pair of the first and second slide rails 106, the number of parts of the extendable member 162 can be reduced. Thus, the extendable member 162 can be simple in structure and length adjustment and attachment thereof can be facilitated.

In embodiments where the extendable member 162 comprises a shock absorber, space can be used efficiently and the degree of freedom in laying out parts around the linkage can be improved as compared with embodiments where a shock absorber is provided separately. Providing an extendable member 162 with shock absorbing characteristics improves the ability of the rear suspension 26 to adhere to the road surface 212 during low-speed operation and minimizes pitching of the slide rails 106 or the vehicle body frame 28 during higher-speed operations.

Although the present invention has been described in terms of a certain embodiment, other embodiments apparent to those of ordinary skill in the art also are within the scope of the invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims.

What is claimed is:

1. A snowmobile, comprising:
   a vehicle body frame;
   at least one slide rail disposed below the vehicle body frame;
   an extendable member capable of being extended and contracted within a prescribed range;
   a front torque arm having a plurality of coupling locations, the front torque arm being coupled with the vehicle body frame at an upper front coupling location, the front torque arm being coupled with the extendable member at a lower front coupling location located generally below the upper front coupling location, the front torque arm being coupled with the at least one slide rail at an intermediate front coupling location located generally below the upper front coupling location and generally above the lower front coupling location; and a rear torque arm having a plurality of coupling locations, the rear torque arm being coupled with the vehicle body frame at an upper rear coupling location, the rear torque arm being coupled with the extendable member at a lower rear coupling location located generally below the upper rear coupling location, the rear torque arm being coupled with the at least one slide rail;

wherein the vehicle body frame, the front torque arm, the rear torque arm, and the extendable member define a four-node linkage that provides for the vertical distance between the vehicle body frame and the at least one slide rail to vary.

2. The snowmobile of claim 1, wherein the four-node linkage has a fully expanded configuration that defines a maximum vertical distance between the vehicle body frame and the at least one slide rail, and the upper front coupling location, the upper rear coupling location, the lower front coupling location, and the lower rear coupling location are positioned in a quadrilateral arrangement in the fully expanded configuration, and wherein the four-node linkage has a fully contracted configuration that defines a minimum vertical distance between the vehicle body frame and the at least one slide rail, and the upper front coupling location, the upper rear coupling location, the lower front coupling location, and the lower rear coupling location are positioned in a quadrilateral arrangement in the fully contracted configuration.

3. The snowmobile of claim 2, wherein the upper front coupling location, the upper rear coupling location, the lower front coupling location, and the lower rear coupling location are positioned in a quadrilateral arrangement in every configuration of the four-node linkage between the fully expanded configuration and the fully contracted configuration.

4. The snowmobile of claim 1, wherein the four-node linkage has a plurality of configurations for varying the vertical distance between the vehicle body frame and the at least one slide rail, wherein the upper front coupling location, the upper rear coupling location, the lower front coupling location, and the lower rear coupling location are positioned in a quadrilateral arrangement in each of the plurality of configurations.

5. The snowmobile of claim 1, additionally comprising a shock absorber having a first end and a second end, the first end being coupled with the four-node linkage near an upper portion of the front torque arm and the second end being coupled with the four-node linkage near an upper portion of the rear torque arm.

6. The snowmobile of claim 1, additionally comprising a shock absorber having a first end and a second end, the first end being coupled with the four-node linkage near an upper portion of the front torque arm and the second end being coupled with a portion of the at least one slide rail.

7. The snowmobile of claim 1, wherein the extendable member comprises a shock absorber.

8. The snowmobile of claim 1, wherein the rear torque arm is coupled with the at least one slide rail at an intermediate rear coupling location located generally below the upper rear coupling location and generally above the lower front coupling location.

9. A snowmobile, comprising:

a vehicle body frame;

at least one slide rail disposed below the vehicle body frame;

an extendable member capable of being extended and contracted within a prescribed range;

a front torque arm having a plurality of coupling locations, the front torque arm being coupled with the vehicle body frame at one or more front frame coupling locations, the front torque arm being coupled with the at least one slide rail at a front rail coupling location, the front torque arm being coupled with the extendable member at a front member coupling location, the coupling locations being configured such that the front rail coupling location is located rearward of a plane passing through the one or more front frame coupling locations and the front member coupling location; and a rear torque arm having a plurality of coupling locations, the rear torque arm being coupled with the vehicle body frame at one or more rear frame coupling locations, the rear torque arm being coupled with the at least one slide rail at a rear rail coupling location, the rear torque arm being coupled with the extendable member at a rear member coupling location, the coupling locations being configured such that the rear member coupling location is located forward of a plane passing through the one or more rear frame coupling locations and the rear rail coupling location;

wherein the vehicle body frame, the front torque arm, the rear torque arm, and the extendable member define a four-node linkage that provides for the vertical distance between the vehicle body frame and the at least one slide rail to vary.

10. A snowmobile, comprising:

a vehicle body frame;

at least one slide rail disposed below the vehicle body frame;

an extendable member capable of being extended and contracted within a prescribed range;

a front torque arm having a plurality of coupling locations, the front torque arm being coupled with the vehicle body frame at one or more front frame coupling locations, the front torque arm being coupled with the at least one slide rail at a front rail coupling location, the front torque arm being coupled with the extendable member at a front member coupling location, the coupling locations being configured such that the front rail coupling location is located rearward of a plane passing through the one or more front frame coupling locations and the front member coupling location; and a rear torque arm having a plurality of coupling locations, the rear torque arm being coupled with the vehicle body frame at one or more rear frame coupling locations, the rear torque arm being coupled with the at least one slide rail at a rear rail coupling location, the rear torque arm being coupled with the extendable member at a rear member coupling location;

wherein the vehicle body frame, the front torque arm, the rear torque arm, and the extendable member define a four-node linkage that provides for the vertical distance between the vehicle body frame and the at least one slide rail to vary; and wherein the four-node linkage has a fully expanded configuration that defines a maximum vertical distance between the vehicle body frame and the at least one slide rail, and the one or more front frame coupling locations, the one or more rear frame coupling locations, the front member coupling location, and the rear member coupling location are positioned in a quadrilateral arrangement in the fully expanded configuration, and wherein the four-node linkage has a fully contracted configuration that defines a minimum vertical distance between the vehicle body frame and the at least one slide rail, and the one or more front frame coupling locations, the one or more rear frame coupling locations, the front member coupling location, and the rear member coupling location are positioned in a quadrilateral arrangement in the fully expanded configuration.

11. The snowmobile of claim 10, wherein the one or more front frame coupling locations, the one or more rear frame coupling locations, the front member coupling location, and the rear member coupling location are positioned in a quadrilateral arrangement in every configuration of the four-node linkage between the fully expanded configuration and the fully contracted configuration.

12. A snowmobile, comprising:
a vehicle body frame;
at least one slide rail disposed below the vehicle body frame;
an extendable member capable of being extended and contracted within a prescribed range;
a front torque arm having a plurality of coupling locations, the front torque arm being coupled with the vehicle body frame at one or more front frame coupling locations, the front torque arm being coupled with the at least one slide rail at a front rail coupling location, the front torque arm being coupled with the extendable member at a front member coupling location, the coupling locations being configured such that the front rail coupling location is located rearward of a plane passing through the one or more front frame coupling locations and the front member coupling location; and
a rear torque arm having a plurality of coupling locations, the rear torque arm being coupled with the vehicle body frame at one or more rear frame coupling locations, the rear torque arm being coupled with the at least one slide rail at a rear rail coupling location, the rear torque arm being coupled with the extendable member at a rear member coupling location;
wherein the vehicle body frame, the front torque arm, the rear torque arm, and the extendable member define a four-node linkage that provides for the vertical distance between the vehicle body frame and the at least one slide rail to vary; and
wherein the four-node linkage has a plurality of configurations for varying the vertical distance between the vehicle body frame and the at least one slide rail, wherein the one or more front frame coupling locations, the one or more rear frame coupling locations, the front member coupling location, and the rear member coupling location are positioned in a quadrilateral arrangement in each of the plurality of configurations.

13. A snowmobile, comprising:
a vehicle body frame;
at least one slide rail disposed below the vehicle body frame;
an extendable member capable of being extended and contracted within a prescribed range;

a front torque arm having a plurality of coupling locations, the front torque arm being coupled with the vehicle body frame at one or more front frame coupling locations, the front torque arm being coupled with the at least one slide rail at a front rail coupling location, the front torque arm being coupled with the extendable member at a front member coupling location, the coupling locations being configured such that the front rail coupling location is located rearward of a plane passing through the one or more front frame coupling locations and the front member coupling location;
a rear torque arm having a plurality of coupling locations, the rear torque arm being coupled with the vehicle body frame at one or more rear frame coupling locations, the rear torque arm being coupled with the at least one slide rail at a rear rail coupling location, the rear torque arm being coupled with the extendable member at a rear member coupling location; and
a shock absorber having a first end and a second end, the first end being coupled with the four-node linkage near an upper portion of the front torque arm and the second end being coupled with the four-node linkage near an upper portion of the rear torque arms;
wherein the vehicle body frame, the front torque arm, the rear torque arm, and the extendable member define a four-node linkage that provides for the vertical distance between the vehicle body frame and the at least one slide rail to vary.

14. The snowmobile of claim 9, additionally comprising a shock absorber having a first end and a second end, the first end being coupled with the four-node linkage near an upper portion of the front torque arm and the second end being coupled with a portion of the at least one slide rail.

15. The snowmobile of claim 9, wherein the extendable member comprises a shock absorber.

16. The snowmobile of claim 9, wherein the plurality of coupling locations of the rear torque arm are configured such that the rear rail coupling location is located rearward of a plane passing through the one or more rear frame coupling locations and the rear member coupling location.

17. A snowmobile, comprising:
a vehicle body frame;
at least one slide rail disposed below the vehicle body frame;
an extendable member capable of being extended and contracted within a prescribed range;
a front torque arm having a plurality of coupling locations, the front torque arm being coupled with the vehicle body frame at a front frame coupling location, the front torque arm being coupled with the at least one slide rail at a front rail coupling location, the front torque arm being coupled with the extendable member at a front member coupling location; and
a rear torque arm having a plurality of coupling locations, the rear torque arm being coupled with the vehicle body frame at a rear frame coupling location, the rear torque arm being coupled with the at least one slide rail at a rear rail coupling location, the rear torque arm being coupled with the extendable member at a rear member coupling location;
wherein the coupling locations are configured such that the front frame coupling location, the rear frame coupling location, the front member coupling location, and the rear member coupling location generally define the nodes of a quadrilateral shape, and the front rail coupling location is located generally within the bounds of the quadrilateral shape.

18. The snowmobile of claim 17, wherein the four-node linkage has a fully expanded configuration that defines a maximum vertical distance between the vehicle body frame and the at least one slide rail, and the front frame coupling location, the rear frame coupling location, the front member coupling location, and the rear member coupling location are positioned in a quadrilateral arrangement in the fully expanded configuration, and wherein the four-node linkage has a fully contracted configuration that defines a minimum vertical distance between the vehicle body frame and the at least one slide rail, and the front frame coupling location, the rear frame coupling location, the front member coupling location, and the rear member coupling location are positioned in a quadrilateral arrangement in the fully expanded configuration.

19. The snowmobile of claim 18, wherein the front frame coupling location, the rear frame coupling location, the front member coupling location, and the rear member coupling location are positioned in a quadrilateral arrangement in every configuration of the four-node linkage between the fully expanded configuration and the fully contracted configuration.

20. The snowmobile of claim 17, wherein the four-node linkage has a plurality of configurations for varying the vertical distance between the vehicle body frame and the at least one slide rail, wherein the front frame coupling location, the rear frame coupling location, the front member coupling location, and the rear member coupling location are positioned in a quadrilateral arrangement in each of the plurality of configurations.

21. The snowmobile of claim 17, additionally comprising a shock absorber having a first end and a second end, the first end being coupled with the four-node linkage near an upper portion of the front torque arm and the second end being coupled with the four-node linkage near an upper portion of the rear torque arm.

22. The snowmobile of claim 17, additionally comprising a shock absorber having a first end and a second end, the first end being coupled with the four-node linkage near an upper portion of the front torque arm and the second end being coupled with a portion of the at least one slide rail.

23. The snowmobile of claim 17, wherein the extendable member comprises a shock absorber.

24. The snowmobile of claim 17, wherein the rear rail coupling location is located generally outside the bounds of the quadrilateral shape.

25. A snowmobile, comprising:
a vehicle body frame;
at least one slide rail disposed below the vehicle body frame;
an extendable member capable of being extended and contracted within a prescribed range;
a front torque arm;
a rear torque arm; and
means for coupling together the vehicle body frame, the front torque arm, the rear torque arm, and the extendable member such that the vehicle body frame, the front torque arm, the rear torque arm, and the extendable member define a four-node quadrilateral linkage system, the linkage system being coupled with the at least one slide rail and being capable of moving between a fully extended position and a fully contracted position while maintaining the quadrilateral shape in at least both the fully extended and fully contracted positions.

26. The snowmobile of claim 25, additionally comprising a shock absorber coupled with the four-node quadrilateral linkage system.

27. The snowmobile of claim 25, wherein the extendable member comprises a shock absorber.

28. A snowmobile, comprising:
a vehicle body frame;
a first slide rail and a second slide rail, the first and second slide rails being disposed below the vehicle body frame;
a front torque arm assembly having an upper portion and a lower portion, the upper portion of the front torque arm assembly being coupled with the vehicle body frame and the lower portion of the front torque arm assembly being coupled with the first and second slide rails at front pivot locations, the front torque arm assembly being rotatable relative the first and second slide rails about the front pivot locations;
a rear torque arm assembly having an upper portion and a lower portion, the upper portion of the rear torque arm assembly being coupled with the vehicle body frame and the lower portion of the rear torque arm assembly being coupled with the first and second slide rails at rear pivot locations, the rear torque arm assembly being rotatable relative the first and second slide rails about the rear pivot locations;
a first protrusion extending from the lower portion of the front torque arm assembly, the first protrusion being integrally rotatable with the front torque arm assembly, the first protrusion extending below the front pivot locations;
a second protrusion extending from the lower portion of the rear torque arm assembly, the second protrusion being integrally rotatable with the rear torque arm assembly; and
an extendable member having a first end and a second end, the first end of the extendable member being coupled with the first protrusion and the second end of the extendable member being coupled with the second protrusion, the extendable member capable of being extended and contracted within a prescribed range.

29. The snowmobile of claim 28, additionally comprising:
a third protrusion extending from the upper portion of the front torque arm assembly, the third protrusion being integrally rotatable with the front torque arm assembly, the third protrusion extending generally below where the front torque arm assembly is coupled with the vehicle body frame;
a fourth protrusion extending from the upper portion of the rear torque arm assembly, the fourth protrusion being integrally rotatable with the rear torque arm assembly, the fourth protrusion extending generally above where the rear torque arm assembly is coupled with the vehicle body frame; and
a shock absorber having a first end and a second end, the first end of the shock absorber being coupled with the third protrusion and the second end of the shock absorber being coupled with the fourth protrusion.

30. The snowmobile of claim 28, wherein the four-node linkage comprises:
a first node defined by a first shaft coupling together the vehicle body frame and the front torque arm assembly;
a second node defined by a second shaft coupling the front torque arm assembly with the extendable member;
a third node defined by a third shaft coupling together the vehicle body frame and the rear torque arm assembly; and
a fourth node defined by a fourth shaft coupling the rear torque arm assembly with the extendable member.

31. The snowmobile of claim 28, wherein the four-node linkage has a fully expanded configuration that defines a maximum vertical distance between the vehicle body frame and the first and second slide rails, and the first node, the second node, the third node, and the fourth node are positioned in a quadrilateral arrangement in the fully expanded configuration, and wherein the four-node linkage has a fully contracted configuration that defines a minimum vertical distance between the vehicle body frame and the first and second slide rails, and the first node, the second node, the third node, and the fourth node are positioned in a quadrilateral arrangement in the fully contracted configuration.

32. The snowmobile of claim 31, wherein the first node, the second node, the third node, and the fourth node are positioned in a quadrilateral arrangement in every configuration of the four-node linkage between the fully expanded configuration and the fully contracted configuration.

33. The snowmobile of claim 28, wherein the four-node linkage has a plurality of configurations for varying the vertical distance between the vehicle body frame and the first and second slide rails, wherein the first node, the second node, the third node, and the fourth node are positioned in a quadrilateral arrangement in each of the plurality of configurations.

34. The snowmobile of claim 28, wherein the extendable member is disposed between the first protrusion and the second protrusion, and generally between the first and second slide rails.

35. The snowmobile of claim 28, wherein the extendable member comprises a shock absorber.

36. The snowmobile of claim 28, wherein the second protrusion extends below the rear pivot locations.

37. A snowmobile, comprising:
 a vehicle body frame;
 at least one slide rail disposed below the vehicle body frame;
 a front torque arm coupled with the vehicle body frame at an upper front coupling location, the front torque arm being coupled with the at least one slide rail at a lower front coupling location located generally below the upper front coupling location; and
 a rear torque arm coupled with the vehicle body frame at an upper rear coupling location, the rear torque arm being coupled with the at least one slide rail at a lower rear coupling location located generally below the upper front coupling location; and
 an extendable member having a first end and a second end, the first end being coupled with the front torque arm at a location near the lower front coupling location, the second end being coupled with the rear torque arm at a location near the lower rear coupling location.

38. The snowmobile of claim 37, wherein the extendable member is disposed generally between first and second slide rails.

39. The snowmobile of claim 37, wherein the extendable member comprises a shock absorber.

40. A snowmobile, comprising:
 a vehicle body frame;
 at least one slide rail disposed below the vehicle body frame;
 an extendable member capable of being extended and contracted within a prescribed range, having a fully extended configuration and a fully contracted configuration;
 a front torque arm having a plurality of coupling locations, the front torque arm being coupled with the vehicle body frame at one or more front frame coupling locations, the front torque arm being coupled with the at least one slide rail at a front rail coupling location, the front torque arm being coupled with the extendable member at a front member coupling location; and
 a rear torque arm having a plurality of coupling locations, the rear torque arm being coupled with the vehicle body frame at one or more rear frame coupling locations, the rear torque arm being coupled with the at least one slide rail at a rear rail coupling location, the rear torque arm being coupled with the extendable member at a rear member coupling location;
 wherein the vehicle body frame, the front torque arm, the rear torque arm, and the extendable member define a four-node linkage that provides for the vertical distance between the vehicle body frame and the at least one slide rail to vary, such that the vertical distance can continue to vary even when the extendable member is in the fully extended configuration or in the fully contracted configuration.

* * * * *